United States Patent
Gaal et al.

(10) Patent No.: US 11,381,368 B2
(45) Date of Patent: Jul. 5, 2022

(54) UPLINK CONTROL CHANNEL FOR ACKNOWLEDGING INCREASED NUMBER OF DOWNLINK COMPONENT CARRIERS

(71) Applicant: QUALCOMM Incorporated, San Diego, CA (US)

(72) Inventors: Peter Gaal, San Diego, CA (US); Wanshi Chen, San Diego, CA (US); Jelena Damnjanovic, Del Mar, CA (US); Hao Xu, Beijing (CN); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/582,525

(22) Filed: Sep. 25, 2019

(65) Prior Publication Data
US 2020/0021415 A1 Jan. 16, 2020

Related U.S. Application Data

(63) Continuation of application No. 15/004,504, filed on Jan. 22, 2016, now Pat. No. 10,511,427.

(Continued)

(51) Int. Cl.
*H04J 14/00* (2006.01)
*H04J 3/08* (2006.01)
(Continued)

(52) U.S. Cl.
CPC .......... *H04L 5/0055* (2013.01); *H04L 1/0078* (2013.01); *H04L 1/1861* (2013.01);
(Continued)

(58) Field of Classification Search
CPC ..... H04L 27/2636; H04L 5/0055; H04L 1/18; H04L 1/1822; H04L 1/1692;
(Continued)

(56) References Cited

U.S. PATENT DOCUMENTS 8,582,518 B2  11/2013  Baldemair et al.
8,804,639 B2  8/2014  Chen et al.
(Continued)

FOREIGN PATENT DOCUMENTS

CN  101924616 A  12/2010
CN  102884750 A  1/2013
(Continued)

OTHER PUBLICATIONS

CATT: "UL ACK/NACK Transmission Methods for LTE-A", 3GPP TSG-RAN WG1 Meeting #60bis, R1-102453, Apr. 12, 2010, 8 Pages, URL: http://www.3gpp.org/ftp/tsg_ran/WG1_RL1/TSGR1_60b/Docs/R1-102453.zip.
(Continued)

*Primary Examiner* — Khaled M Kassim
*Assistant Examiner* — Jason A Harley

(57) ABSTRACT

Techniques are described for wireless communication. One method includes determining, based at least in part on a number of downlink component carriers (CCs) scheduled for a user equipment (UE) during a reporting interval, a number of bits to be included in a physical uplink control channel (PUCCH) acknowledgement/non-acknowledgement (ACK/NAK) payload for the reporting interval; and selecting, based at least in part on the determined number of bits, a format of the PUCCH ACK/NAK payload.

24 Claims, 22 Drawing Sheets

Related U.S. Application Data

(60) Provisional application No. 62/110,307, filed on Jan. 30, 2015.

(51) Int. Cl.

| | | |
|---|---|---|
| *H04W 84/12* | (2009.01) | |
| *H04W 72/10* | (2009.01) | |
| *H04W 72/12* | (2009.01) | |
| *H04L 5/00* | (2006.01) | |
| *H04H 20/71* | (2008.01) | |
| *H04W 52/14* | (2009.01) | |
| *H04L 1/00* | (2006.01) | |
| *H04L 1/18* | (2006.01) | |
| *H04W 72/04* | (2009.01) | |
| *H04W 72/14* | (2009.01) | |

(52) U.S. Cl.
CPC ............ *H04L 5/001* (2013.01); *H04L 5/0048* (2013.01); *H04W 72/0413* (2013.01); *H04W 72/0453* (2013.01); *H04W 72/14* (2013.01); *H04L 1/0073* (2013.01); *H04L 2001/0098* (2013.01)

(58) Field of Classification Search
CPC ............ H04L 1/1621; H04W 72/0453; H04W 72/0413; H04W 84/12; H04W 28/02
USPC .................................................. 370/208, 342
See application file for complete search history.

(56) References Cited

U.S. PATENT DOCUMENTS

| | | | |
|---|---|---|---|
| 8,842,609 B2 | 9/2014 | Lee et al. | |
| 9,106,419 B2 | 8/2015 | Chen et al. | |
| 10,270,580 B2 | 4/2019 | Ahn et al. | |
| 10,581,561 B2 | 3/2020 | Seo et al. | |
| 10,601,567 B2 | 3/2020 | Marinier et al. | |
| 2003/0095588 A1 | 5/2003 | Yellin et al. | |
| 2008/0287155 A1 | 11/2008 | Xu et al. | |
| 2009/0245195 A1 | 10/2009 | Bhattad et al. | |
| 2009/0290538 A1 | 11/2009 | Kim et al. | |
| 2010/0208578 A1* | 8/2010 | Lee ................ | H04B 7/0465 370/210 |
| 2010/0271970 A1 | 10/2010 | Pan et al. | |
| 2010/0272048 A1* | 10/2010 | Pan ................ | H04L 1/1671 370/329 |
| 2011/0141928 A1 | 6/2011 | Shin et al. | |
| 2011/0244877 A1* | 10/2011 | Farajidana ............ | H04L 5/0073 455/452.2 |
| 2011/0261858 A1 | 10/2011 | Baldemair et al. | |
| 2011/0268101 A1 | 11/2011 | Wang et al. | |
| 2011/0268102 A1* | 11/2011 | Zhu .................. | H04L 5/001 370/345 |
| 2011/0305179 A1* | 12/2011 | Wang .............. | H04L 1/1692 370/311 |
| 2012/0039158 A1* | 2/2012 | Cheng .............. | H04B 7/0671 370/203 |
| 2012/0039270 A1* | 2/2012 | Nguyen ............. | H04L 27/2636 370/329 |
| 2012/0039279 A1 | 2/2012 | Chen et al. | |
| 2012/0140716 A1 | 6/2012 | Baldemair et al. | |
| 2012/0155337 A1 | 6/2012 | Park | |
| 2012/0163159 A1* | 6/2012 | Luo ................ | H04L 1/1692 370/210 |
| 2012/0218881 A1* | 8/2012 | Liang .............. | H04L 1/1896 370/216 |
| 2012/0257531 A1* | 10/2012 | Ko ................. | H04L 5/0053 370/252 |
| 2012/0294272 A1 | 11/2012 | Han et al. | |
| 2012/0300741 A1 | 11/2012 | Han et al. | |
| 2012/0320826 A1 | 12/2012 | Kim et al. | |
| 2012/0327880 A1 | 12/2012 | Ahn et al. | |
| 2012/0327885 A1 | 12/2012 | Chung et al. | |
| 2013/0022019 A1 | 1/2013 | Han et al. | |
| 2013/0044667 A1 | 2/2013 | Han et al. | |
| 2013/0100911 A1 | 4/2013 | Lv et al. | |
| 2013/0100919 A1 | 4/2013 | Han et al. | |
| 2013/0188592 A1 | 7/2013 | Yang et al. | |
| 2013/0258914 A1 | 10/2013 | Seo et al. | |
| 2013/0258960 A1* | 10/2013 | Chen ................ | H04L 5/0055 370/329 |
| 2013/0259011 A1 | 10/2013 | Nakashima et al. | |
| 2013/0272258 A1 | 10/2013 | Lee et al. | |
| 2013/0286905 A1 | 10/2013 | Yang et al. | |
| 2013/0294299 A1 | 11/2013 | Park et al. | |
| 2013/0294333 A1 | 11/2013 | Chen et al. | |
| 2013/0294353 A1 | 11/2013 | Han et al. | |
| 2013/0322343 A1 | 12/2013 | Seo et al. | |
| 2013/0322378 A1 | 12/2013 | Guan et al. | |
| 2014/0071864 A1 | 3/2014 | Seo et al. | |
| 2014/0119284 A1 | 5/2014 | Baldemair et al. | |
| 2014/0269452 A1 | 9/2014 | Papasakellariou | |
| 2014/0286208 A1 | 9/2014 | Papasakellariou et al. | |
| 2014/0369294 A1* | 12/2014 | Seo ................ | H04L 27/2636 370/329 |
| 2015/0200761 A1 | 7/2015 | Kim et al. | |
| 2015/0327230 A1 | 11/2015 | Takeda et al. | |
| 2016/0226644 A1 | 8/2016 | Gaal et al. | |
| 2016/0242170 A1* | 8/2016 | Xu ................ | H04W 8/08 |
| 2019/0349918 A1 | 11/2019 | Nayeb Nazar et al. | |
| 2020/0112417 A1 | 4/2020 | Park et al. | |
| 2020/0120666 A1 | 4/2020 | Baldemair et al. | |
| 2020/0162224 A1 | 5/2020 | Ahn et al. | |

FOREIGN PATENT DOCUMENTS

| | | |
|---|---|---|
| CN | 103098407 A | 5/2013 |
| EP | 3241394 A1 | 11/2017 |
| EP | 3253108 A1 | 12/2017 |
| EP | 3253109 A1 | 12/2017 |
| EP | 3253110 A1 | 12/2017 |
| JP | 2012506662 A | 3/2012 |
| JP | 2014505423 A | 2/2014 |
| JP | 2014120941 A | 6/2014 |
| WO | WO-2012024222 A2 | 2/2012 |
| WO | WO-2012047908 A1 | 4/2012 |
| WO | WO-2012096484 A2 | 7/2012 |
| WO | 2013112004 A1 | 8/2013 |
| WO | 2016093556 A1 | 6/2016 |
| WO | 2016105099 A1 | 6/2016 |

OTHER PUBLICATIONS

Qualcomm Incorporated: "HARQ ACK for up to 32 DL Carriers", 3GPP TSG RAN WG1 #80, R1-150742, 3GPP, Feb. 9, 2015, pp. 1-5.

Huawei, et al., "Details of Reusing Dual Connectivity for PUCCH on SCell with CA", 3GPP TSG RAN WG1 Meeting #78, 3GPP Draft; R1-142834, 3rd Generation Partnership Project (3GPP), Mobile Competence Centre; 650, Route Des Lucioles; F-06921 Sophia-Antipolis Cedex; France, vol. RAN WG1, No. Dresden, Germany; Aug. 18, 2014-Aug. 22, 2014, Aug. 17, 2014 (Aug. 17, 2014), 8 Pages, XP050788319, Retrieved from the Internet: URL: http://www.3gpp.org/ftp/Meetings_3GPP_SYNC/RAN1/Docs/ [retrieved on Aug. 17, 2014] section 1, Introduction section 3.1, UCI feedback when no PUSCH is scheduled figure 1.

Huawei, et al., "Extending PUCCH on PCell and pSCell to Carrier Aggregation", 3GPP TSG RAN WG1 Meeting #77, 3GPP Draft; R1-142337, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014, May 18, 2014 (May 18, 2014), 4 Pages, XP050787931, Retrieved from the Internet: URL: http://www.3gpp.org/ftp/Meetings_3GPP_SYNC/RAN1/Docs/ [retrieved on May 18, 2014] section 2, Motivation to extend PUCCH to PCell on pSCell to CA section 3, Additional work to extend PUCCH on PCell and pSCell to CA.

International Search Report and Written Opinion—PCT/US2016/014756—ISA/EPO—dated Jul. 27, 2016.

(56) References Cited

OTHER PUBLICATIONS

ISA/EPO, Partial International Search Report of the International Searching Authority, Int'l. App. No. PCT/US2016/014 756, dated Apr. 22, 2016, European Patent Office, Rijswijk, NL, 8 pgs.
LG Electronics: "Details on DFT-S-OFDM Format for CA PUCCH", 3GPP TSG RAN WG1 #62, 3GPP Draft; R1-104757_LG_DFTDetail_ CAPUCCH, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010, Aug. 18, 2010 (Aug. 18, 2010), pp. 1-4, XP050450136, [retrieved on Aug. 18, 2010] section 2.1, Channel coding.
NTT Docomo: "Views on DFT-S-OFDM Format Details", 3GPP TSG RAN WG1 Meeting #62, R1-104925, Madrid, Spain, Aug. 23-27, 2010, pp. 1-7, XP50450069A.
Qualcomm Incorporated: "Number of Bits Conveyed on Multi-Ack Pucch Format", 3GPP TSG RAN WG1 #61bis, 3GPP Draft; R1-103535 Number of Bits Conveyed on Multi-Bit Ack Pucch Format, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010-Jul. 2, 2010, Jun. 22, 2010 (Jun. 22, 2010), pp. 1-4, XP050598457, [retrieved on Jun. 22, 2010], Section 2.1-2.2.
Samsung: "UCI Payload Aspects for eIMTA", 3GPP TSG RAN WG1 #74bis, 3GPP Draft; R1-134155 EIMTA UCI Payload, 3rd Generation Partnership Project (3GPP), Mobile Competence Centre; 650, Route Des Lucioles; F-06921 Sophia-Antipolis Cedex; France, vol. RAN WG1, No. Guangzhou, China; Oct. 7, 2013-Oct. 11, 2013, Sep. 28, 2013 (Sep. 28, 2013), pp. 1-3, XP050717344, Retrieved from the Internet: URL: http://www.3gpp.org/ftp/tsg_ran/WG1_RL1/TSGR1_74b/Docs/ [retrieved on Sep. 28, 2013].
Taiwan Search Report—TW105102385—TIPO—dated Mar. 11, 2019.
CATT: "UL ACK/NACK Transmission Methods for LTE-A", R1-101757, 3GPP TSG RAN WG1 Meeting #60bis, Beijing, China, Apr. 12-16, 2010, 8 Pages.
Taiwan Search Report—TW108145331—TIPO—dated May 20, 2020.
European Search Report—EP20209009—Search Authority—Munich—dated Mar. 2, 2021.
Oizumi T., "Improvement of the Worst ACK/NACK Bit Error Performance for LTE-Advanced Channel Selection", IEICE Technical Report vol. 111, No. 260, JP, The Institute of Electronics, Information and Communication Engineers (IEICE), Oct. 19, 2011, vol. 111, pp. 7-12.
3GPP TS 36.213: "3rd Generation Partnership Project; Technical Specification Group Radio Access Network; Evolved Universal Terrestrial Radio Access (E-UTRA); Physical Layer Procedures (Release 12)", 3GPP TS 36.213 V12.4.0 (Dec. 2014), pp. 1-225.
Al-Shibly M.A.M., et al., "Carrier Aggregation in Long Term Evolution-Advanced", 2012 IEEE Control and System Graduate Research Colloquium (ICSGRC 2012), Aug. 2012, pp. 154-159.
Editor (Motorola Mobility): "Introduction of D2D (ProSe)", R1-145494, 3GPP TSG-RAN WG1 Meeting #79, San Francisco, USA, Nov. 17-21, 2014, 236 Pages.
Ericsson., et al., "PUCCH Demodulation Requirements Scenarios and Assumptions", R4-110066, 3GPP TSG-RAN4 57 #AH, Austin, Texas, Jan. 17-21, 2011, 5 Pages.
LG Electronics: "ACK/NACK Transmission Approach in LTE-A", R1-102412, 3GPP TSG RAN WG1 #60bis, Beijing, China Apr. 12-16, 2010, 5 Pages.
LG Electronics: "Remaining Details of HARQ Feedback for TDD eIMTA", R1-140299, 3GPP TSG RAN WG1 Meeting #76, Prague, Czech Republic, Feb. 10-14, 2014, pp. 1-4.
Milos J., et al., "Simulation of UCI Transmission via PUCCH in LTE Uplink", 2014 24th International Conference Radioelektronika, Apr. 2014, 4 Pages.
Nokia Siemens Networks., et al., "Simulation Assumptions for CA BS Demodulation Requirements", R4-110563, 3GPP TSG-RSN WG4 #57AH, Austin, TX, US, Jan. 17-21, 2011, 6 Pages.
Samsung: "Correction to PUCCH Procedures in Case of FDD Pcell and TDD Scell in TDD-FDD CA", R1-144712, 3GPP TSG RAN WG1#79, San Francisco, USA, Nov. 17-21, 2014, 4 Pages.

* cited by examiner

600

| | No. of Bits to be Included in PUCCH ACK/NAK Payload | UE Multiplexing Density Per RB | Spreading Factor | Number of RBs Allocated Per Symbol Period |
|---|---|---|---|---|
| First Format 605 | 0-21 | 4-5 | Normal | 1 |
| Second Format 610 | 22-60 | 2 | Modified | 1 |
| Third Format 615 | 61-120 | 1 | None | 1 |
| Fourth Format 620 | 121-240 | 1 | None | 2 |
| Fifth Format 625 | 241-360 | 1 | None | 3 |

FIG. 6

UPLINK CONTROL CHANNEL FOR ACKNOWLEDGING INCREASED NUMBER OF DOWNLINK COMPONENT CARRIERS

CROSS REFERENCES

The present application for patent is a Continuation of U.S. patent application Ser. No. 15/004,504 by Gaal, et al., entitled "Uplink Control Channel For Acknowledging Increased Number of Downlink Component Carriers" filed Jan. 22, 2016, which claims priority to U.S. Provisional Patent Application No. 62/110,307 by Gaal et al., entitled "Uplink Control Channel For Acknowledging Increased Number Of Downlink Component Carriers," filed Jan. 30, 2015, assigned to the assignee hereof, and expressly incorporated by reference herein.

BACKGROUND

Field of the Disclosure

The present disclosure, for example, relates to wireless communication systems, and more particularly to techniques for increasing the number of downlink component carriers that can be acknowledged (ACK'd) or non-acknowledged (NAK'd) in a payload of an uplink control channel.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

In some modes of operation, a UE may operate in a carrier aggregation mode or dual-connectivity mode, in which the UE may be configured to communicate with one or more base stations using a plurality of component carriers. When receiving transmissions over a plurality of downlink component carriers, a UE may use a payload of an uplink control channel to ACK or NAK receipt of the transmissions.

SUMMARY

The present disclosure, for example, relates to one or more techniques for increasing the number of downlink component carriers that can be acknowledged or non-acknowledged in a payload of an uplink control channel. With increases in the spectrum available for Long Term Evolution (LTE) communications or LTE-Advanced (LTE-A) communications (LTE/LTE-A communications), and in some cases increases in the granularity of available spectrum, the number of component carriers over which a UE can simultaneously communicate is being increased. However, the format of the physical uplink control channel (PUCCH) ACK/NAK payload used in LTE/LTE-A systems has limited ACK/NAK capacity. Although techniques can be used to increase the ACK/NAK capacity, there are times when a UE may simultaneously communicate over fewer than 32 component carriers (and possibly even fewer than five component carriers). A static PUCCH ACK/NAK payload format that provides capacity for acknowledging/non-acknowledging transmissions over a maximum number of component carriers may therefore be wasteful when fewer than the maximum number of component carriers is scheduled. Techniques described in the present disclosure provide for selecting a format of a PUCCH ACK/NAK payload depending on the number of bits to be included in the PUCCH ACK/NAK payload. Techniques are also described for ensuring that the PUCCH ACK/NAK payload format selected by a UE is the same PUCCH ACK/NAK payload format selected (and expected) by a base station.

In a first set of illustrative examples, a method for wireless communication is described. In one configuration, the method may include determining, based at least in part on a number of downlink component carriers (CCs) scheduled for a user equipment (UE) during a reporting interval, a number of bits to be included in a physical uplink control channel (PUCCH) acknowledgement/non-acknowledgement (ACK/NAK) payload for the reporting interval. The method may also include selecting, based at least in part on the determined number of bits, a format of the PUCCH ACK/NAK payload.

In some examples of the method, selecting the format of the PUCCH ACK/NAK payload may include selecting one of a plurality of predefined formats for the PUCCH ACK/NAK payload, wherein the predefined formats for the PUCCH ACK/NAK payload include different combinations of: UE multiplexing densities within a resource block (RB), spreading factors, or numbers of RBs allocated per symbol period. In some of these examples, each of the predefined formats for the PUCCH ACK/NAK payload may be based at least in part on a format including two reference signal symbol periods per slot.

In some examples of the method, the selected format of the PUCCH ACK/NAK payload may be based at least in part on a format including two reference signal symbol periods per slot. In some examples of the method, the selected format of the PUCCH ACK/NAK payload may be further based at least in part on a format including one reference signal symbol per slot.

In some examples of the method, selecting the format of the PUCCH ACK/NAK payload may include comparing the number of bits to be included in the PUCCH ACK/NAK payload to a plurality of bit ranges, and selecting the format of the PUCCH ACK/NAK payload based at least in part on the comparing. In some examples, the selected format of the PUCCH ACK/NAK payload may include a UE multiplexing density, within a RB, of at least four UEs. In some examples, the selected format of the PUCCH ACK/NAK payload may include a UE multiplexing density, within a RB, of two UEs, and at least two groups of symbol periods. Each of the at least two groups of symbol periods may include at least one symbol, and spreading may be applied independently within each of the at least two groups of symbol periods. In some examples, a spreading factor of three may be applied to a first group of three symbol periods, a spreading factor of two may be applied to a second group of two symbol periods, and two of three orthogonal cover codes (OCCs) may be used when applying the spreading factor of three. In some examples, a first spreading factor of two may be applied to a first group of one symbol period, a second spreading factor of two may be applied to a second group of two symbol periods, and a third spreading factor of two may be applied to a third group of two symbol periods. In these latter examples, the first spreading factor may be applied using a Walsh code or using elements of an orthogonal Fast Fourier Transform (FFT) matrix.

In some examples of the method, each spreading factor of a plurality of spreading factors of two may be applied to a respective symbol period of a plurality of symbol periods. In these examples, each spreading factor of the plurality of spreading factors of two may be applied using a Walsh code or using elements of an orthogonal FFT matrix. In some examples, the selected format of the PUCCH ACK/NAK payload may include no UE multiplexing within a RB, no spreading factor, and an RB allocation per symbol period of one. In some examples, the selected format of the PUCCH ACK/NAK payload may include no UE multiplexing within a RB, no spreading factor, and a RB allocation per symbol period of two. In some examples, the selected format of the PUCCH ACK/NAK payload may include no UE multiplexing within a RB, no spreading factor, and a RB allocation per symbol period of three.

In some examples, the method may include identifying an allocation of a plurality of downlink CCs for the UE, and identifying a first subset of downlink CCs within the plurality of downlink CCs. In these examples, the number of bits to be included in the PUCCH ACK/NAK payload may be identified for the first subset of downlink CCs. In some examples, the PUCCH ACK/NAK payload may include a first PUCCH ACK/NAK payload, and the method may include identifying a second subset of downlink CCs within the plurality of downlink CCs, where the second subset of downlink CCs corresponds to a second PUCCH ACK/NAK payload. In some examples, the method may further include transmitting the first PUCCH ACK/NAK payload on a first uplink CC, and transmitting the second PUCCH ACK/NAK payload on a second uplink CC. In some examples, the method may further include transmitting the first PUCCH ACK/NAK payload and the second PUCCH ACK/NAK payload on a same uplink CC.

In some examples, the method may include receiving, at the UE, a number of downlink grants indicating the downlink CCs scheduled for the UE, and receiving with each of the downlink grants a respective downlink assignment index (DAI). In some examples, the respective DAI for a downlink grant may indicate a bit mapping and resource selection, in the PUCCH ACK/NAK payload, for acknowledging/non-acknowledging each transmission over each downlink CC scheduled in the downlink grant. In some examples, the respective DAI for a downlink grant may include a sequence number indicating a relationship between at least one downlink CC scheduled in the downlink grant and at least one downlink CC scheduled in another downlink grant. In these latter examples, the method may include determining, based at least in part on the sequence number, a bit mapping and resource selection, in the PUCCH ACK/NAK payload, for acknowledging/non-acknowledging each transmission over each downlink CC scheduled in the downlink grant.

In some examples, the method may include transmitting, from a base station to the UE, a plurality of downlink grants indicating the downlink CCs scheduled for the UE, and transmitting a plurality of DAIS. Each of the plurality of downlink grants may include a respective one of the DAIS in the plurality of DAIS. In some examples, the plurality of DAIS may include a plurality of sequence numbers, and the method may further include introducing sequence discontinuities in the plurality of sequence numbers, to increase the number of bits to be included in the PUCCH ACK/NAK payload. In some examples, the method may further include receiving the PUCCH ACK/NAK payload, and using a set of ACK/NAK bits in the PUCCH ACK/NAK payload, which set of ACK/NAK bits correspond to the sequence discontinuities, as a virtual cyclic redundancy check (CRC).

In some examples, the method may include receiving, at the UE, an ACK/NAK resource indicator (ARI) identifying at least two different uplink CCs. In some examples, the method may include receiving, at the UE, a number of downlink grants indicating the downlink CCs scheduled for the UE; and selecting the format of the PUCCH ACK/NAK payload may include selecting a format used to transmit the PUCCH ACK/NAK payload. In some examples, the method may include transmitting, from a base station to the UE, a plurality of downlink grants indicating the downlink CCs scheduled for the UE; and selecting the format of the PUCCH ACK/NAK payload may include selecting a format used to decode the PUCCH ACK/NAK payload.

In some examples, the method may include configuring at least two groups of downlink CCs, and selecting the format of the PUCCH ACK/NAK payload may be performed for each of the at least two groups of downlink CCs. In some examples, the method may include configuring at least two groups of downlink CCs, and selecting the format of the PUCCH ACK/NAK payload may be performed considering bundling of ACK/NAK bits for the downlink CCs within each group of downlink CCs.

In a second set of illustrative examples, an apparatus for wireless communication is described. In one configuration, the apparatus includes means for determining, based at least in part on a number of downlink CCs scheduled for UE during a reporting interval, a number of bits to be included in a PUCCH ACK/NAK payload for the reporting interval. The apparatus may also include means for selecting, based at least in part on the determined number of bits, a format of the PUCCH ACK/NAK payload. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to determine, based at least in part on a number of downlink CCs scheduled for a UE during a reporting interval, a number of bits to be included in a PUCCH ACK/NAK payload for the reporting interval. The instructions may also be executable by the processor to select, based at least in part on the determined number of bits, a format of the PUCCH ACK/NAK payload. In some examples, the instructions may also be executable by the processor to implement one or more aspects of the method for wireless communication described above with respect to the first set of illustrative examples.

In a fourth set of illustrative examples, a computer program product including a non-transitory computer-readable medium is described. In one configuration, the non-transitory computer-readable medium may include instructions to determine, based at least in part on a number of downlink CCs scheduled for a UE during a reporting interval, a number of bits to be included in a PUCCH ACK/NAK payload for the reporting interval. The non-transitory computer-readable medium may also include instructions to select, based at least in part on the determined number of bits, a format of the PUCCH ACK/NAK payload. In some examples, the non-transitory computer-readable medium may also include instructions to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 shows an exemplary table of predetermined formats of a PUCCH ACK/NAK payload, from which a format of a PUCCH ACK/NAK payload may be selected by a UE or base station, for a reporting interval, in accordance with various aspects of the present disclosure;

DETAILED DESCRIPTION

Techniques are described for increasing the number of downlink component carriers that can be acknowledged (ACK'd) or non-acknowledged (NAK'd) in a payload of an uplink control channel, while providing an ability to multiplex use of the payload between multiple UEs when a single UE does not use the entire payload. In the past, the size of an LTE/LTE-A PUCCH ACK/NAK payload has been static and has allowed the ACKing or NAKing of up to five downlink component carriers (CCs). Specific examples described in the present disclosure enable up to 32 downlink CCs to be ACK'd or NAK'd in an LTE/LTE-A PUCCH ACK/NAK payload, and enable the format of the payload to be selected to optimize its use by multiple UEs or by a UE ACKing or NAKing transmissions over a greater number of downlink CCs. The techniques described in the present disclosure may also be used to select a PUCCH ACK/NAK payload format for ACKing or NAKing transmissions over any number of downlink CCs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
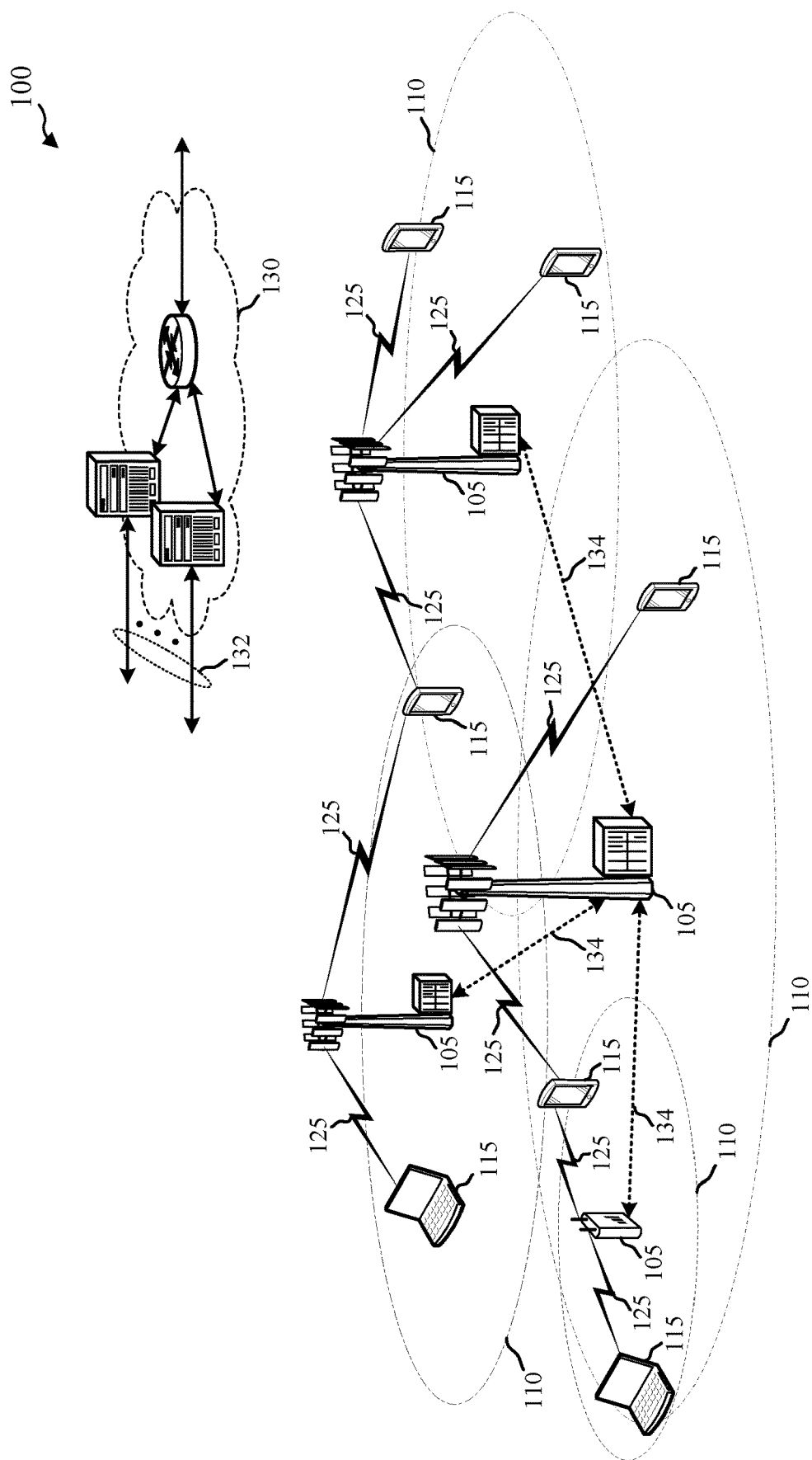
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. When a UE operates in a CA or dual-connectivity mode of operation, downlink transmissions received by a UE on a plurality of downlink CCs may be acknowledged individually, on the same or different uplink CCs, or as part of a PUCCH ACK/NAK payload transmitted on one or more uplink CCs.

In some examples, the wireless communication system 100 may support operation over a dedicated radio frequency spectrum (e.g., a radio frequency spectrum for which transmitting apparatuses may not contend for access because the radio frequency spectrum is licensed to particular users for particular uses, such as a licensed radio frequency spectrum usable for LTE/LTE-A communications) or a shared radio frequency spectrum (e.g., a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner)). The downlink CCs and uplink CCs allocated to a UE may all be allocated over the dedicated radio frequency spectrum, all be allocated over the shared radio frequency spectrum, or be allocated over a combination of the dedicated radio frequency spectrum and the shared radio frequency spectrum.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The downlink transmissions may include, for example, a physical downlink shared channel (PDSCH), a physical downlink control channel (PDCCH; e.g., for transmission over a dedicated radio frequency spectrum), or an enhanced PDCCH (EPDCCH; e.g., for transmission over a shared radio frequency spectrum). The uplink transmissions may include, for example, a physical uplink shared channel (PUSCH) or a physical uplink control channel (PUCCH). In some cases, downlink transmissions received by a UE on a PDSCH may be acknowledged (ACK'd) or non-acknowledged (NAK'd) by ACK/NAK bits transmitted in an uplink transmission over a PUCCH.

As the number of CCs used in a carrier aggregation scenario increases, new techniques for transmitting ACK and NAK messages may utilized by the UEs 115 of the wireless communication system 100. In particular, a UE 115 may select a PUCCH format to transmit ACK/NAK messages based on the number of downlink CCs scheduled for the UE during a reporting interval. For example, the UE may determine a number of ACK/NAK bits to be included in a PUCCH payload for the reporting interval based at least in part on the number of downlink CCs scheduled for the reporting interval. Based on the determined number of bits, the UE 115 may select a PUCCH format. Examples of PUCCH frame types and techniques for selecting an appropriate PUCCH frame for a given reporting interval are explained in more detail below.

Figure 2:
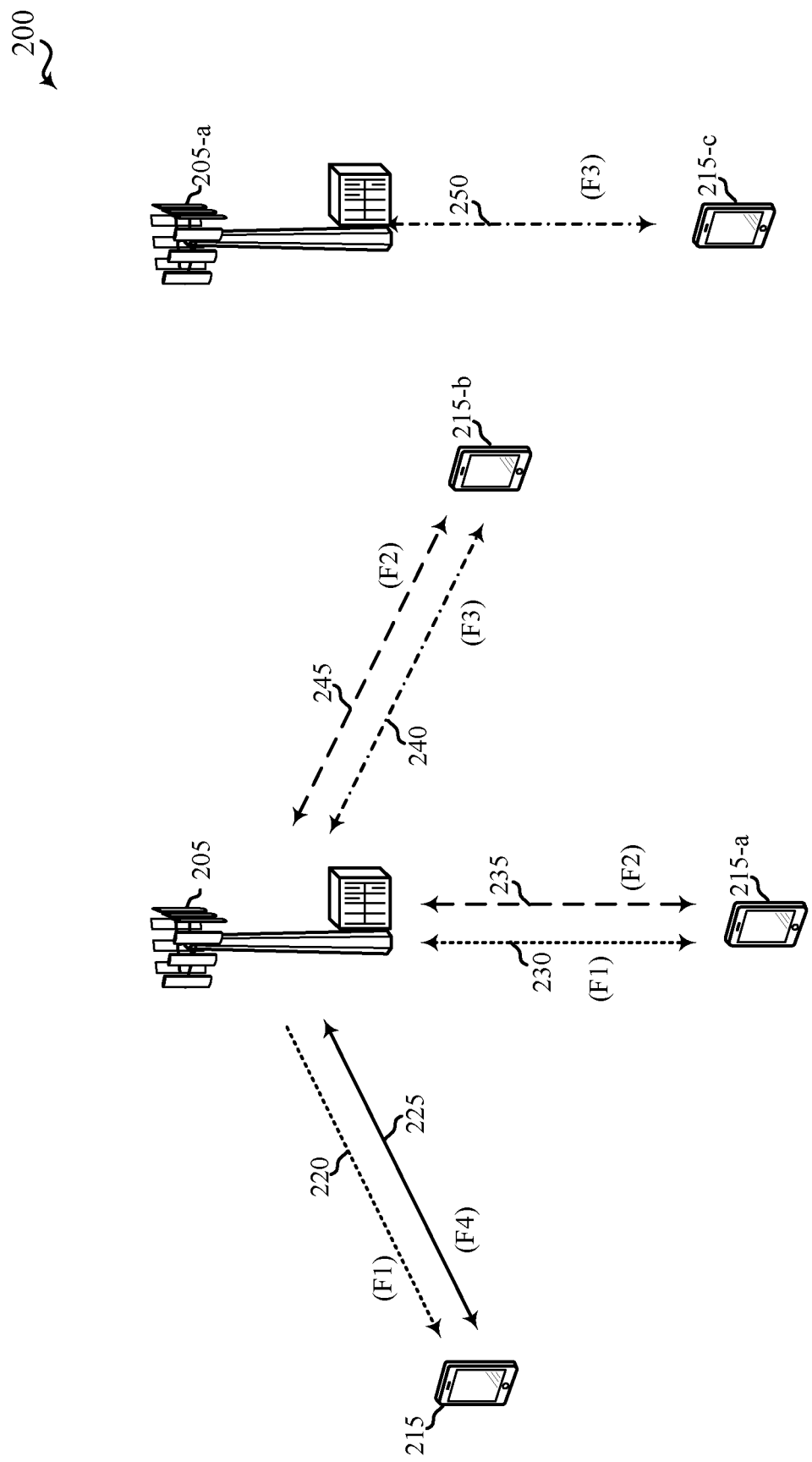
FIG. 2 shows a wireless communication system in which LTE/LTE-A may be deployed under different scenarios using a shared radio frequency spectrum, in accordance with various aspects of the present disclosure.

FIG. 2 shows a wireless communication system 200 in which LTE/LTE-A may be deployed under different scenarios using a shared radio frequency spectrum, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum. The downlink channel 220 in the shared radio frequency spectrum and the first bidirectional link 225 in the dedicated radio frequency spectrum may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and desires to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum and desires to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum and use a shared radio frequency spectrum for capacity offload.

As described above, one type of service provider that may benefit from the capacity offload offered by using LTE/LTE-A in a shared radio frequency spectrum is a traditional MNO having access rights to an LTE/LTE-A dedicated radio frequency spectrum. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum and at least one secondary component carrier (SCC) on the shared radio frequency spectrum.

In the carrier aggregation mode, data and control may, for example, be communicated in the dedicated radio frequency spectrum (e.g., via first bidirectional link 225, third bidirectional link 235, and fifth bidirectional link 245) while data may, for example, be communicated in the shared radio frequency spectrum (e.g., via second bidirectional link 230 and fourth bidirectional link 240). The carrier aggregation mechanisms supported when using a shared radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum (e.g., to a physical channel of the shared radio frequency spectrum). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus is to perform a contention procedure (e.g., an LBT procedure) such as a clear channel assessment (CCA) procedure. The outcome of the CCA procedure may indicate to the transmitting apparatus whether a channel of a shared radio frequency spectrum is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
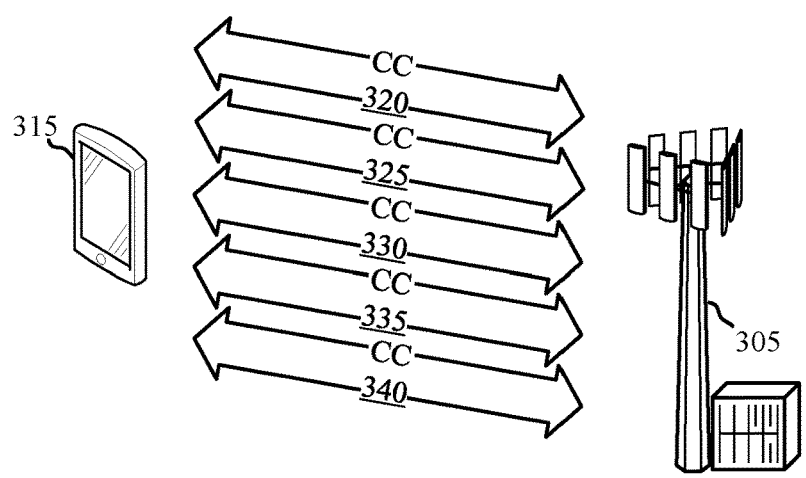
FIG. 3 shows a wireless communication system in which LTE/LTE-A may be deployed in a carrier aggregation scenario, in accordance with various aspects of the present disclosure.

FIG. 3 shows a wireless communication system 300 in which LTE/LTE-A may be deployed in a carrier aggregation scenario, in accordance with various aspects of the present disclosure. The wireless communication system 300 may be an example of portions of the wireless communication system 100 or 200 described with reference to FIG. 1 or 2. Moreover, a base station 305 may be an example of aspects of one or more of the base stations 105, 205, or 205-*a* described with reference to FIG. 1 or 2, while a UE 315 may be an examples of aspects of one or more of the UEs 115, 215, 215-*a*, 215-*b*, or 215-*c* described with reference to FIG. 1 or 2.

When communicating in a carrier aggregation mode using LTE/LTE-A communications, the UE 315 has traditionally communicated with the base station 305 using up to five component carriers. However, techniques described in the present disclosure can increase the size of a PUCCH ACK/NAK payload to allow communication over up to 32 component carriers. One of the component carriers may be designated as a primary component carrier, and the remaining component carriers may be designated as secondary component carriers. Each component carrier may be configured as a downlink component carrier, an uplink component carrier, or a cell (e.g., a component carrier that may be configured for use as a downlink component carrier and/or an uplink component carrier). By way of example, FIG. 3 illustrates communication between the UE 315 and the base station 305 over five component carriers, including a first downlink component carrier 320, a second downlink component carrier 325, a third downlink component carrier 330, a first uplink component carrier 335, and a second uplink component carrier 340. Each of the first downlink component carrier 320, the second downlink component carrier 325, the third downlink component carrier 330, the first uplink component carrier 335, and the second uplink component carrier 340 may operate in a dedicated radio frequency spectrum or a shared radio frequency spectrum, depending on how the component carrier is allocated or configured.

When the UE 315 is configured for operation in a supplemental downlink mode of operation using a shared radio frequency spectrum, as described with reference to FIG. 2, and when the UE 315 is operating in a carrier aggregation mode, one or more of the first downlink component carrier 320, the second downlink component carrier 325, and the third downlink component carrier 330 may operate in the licensed radio frequency spectrum band; one or more of the first downlink component carrier 320, the second downlink component carrier 325, and the third downlink component carrier 330 may operate in the shared radio frequency spectrum; and the first uplink component carrier 335 and the second uplink component carrier 340 may operate in the dedicated radio frequency spectrum.

When the UE 315 is configured for operation in a carrier aggregation mode of operation using the shared radio frequency spectrum, as described with reference to FIG. 2, one or more of the first downlink component carrier 320, the second downlink component carrier 325, and the third downlink component carrier 330 may operate in the dedicated radio frequency spectrum; one or more of the first downlink component carrier 320, the second downlink component carrier 325, and the third downlink component carrier 330 may operate in the shared radio frequency spectrum; one or more of the first uplink component carrier 335 and the second uplink component carrier 340 may operate in the dedicated radio frequency spectrum band; and one or more of the first uplink component carrier 335 and the second uplink component carrier 340 may operate in the shared radio frequency spectrum. In some examples, all of the downlink component carriers may operate in the dedicated radio frequency spectrum, or all of the uplink component carriers may operate in the shared radio frequency spectrum, but not all of the downlink component carriers and all of the uplink component carriers may operate in the shared radio frequency spectrum (e.g., at least one downlink component carrier or at least one uplink component carrier operates in the dedicated radio frequency spectrum).

When the UE 315 is configured for operation in a stand-alone mode of operation using the shared radio frequency spectrum, as described with reference to FIG. 2, and when the UE 315 is operating in a carrier aggregation mode, all of the first downlink component carrier 320, the second downlink component carrier 325, the third downlink component carrier 330, the first uplink component carrier 335, and the second uplink component carrier 340 may operate in the shared radio frequency spectrum.

Figure 4:
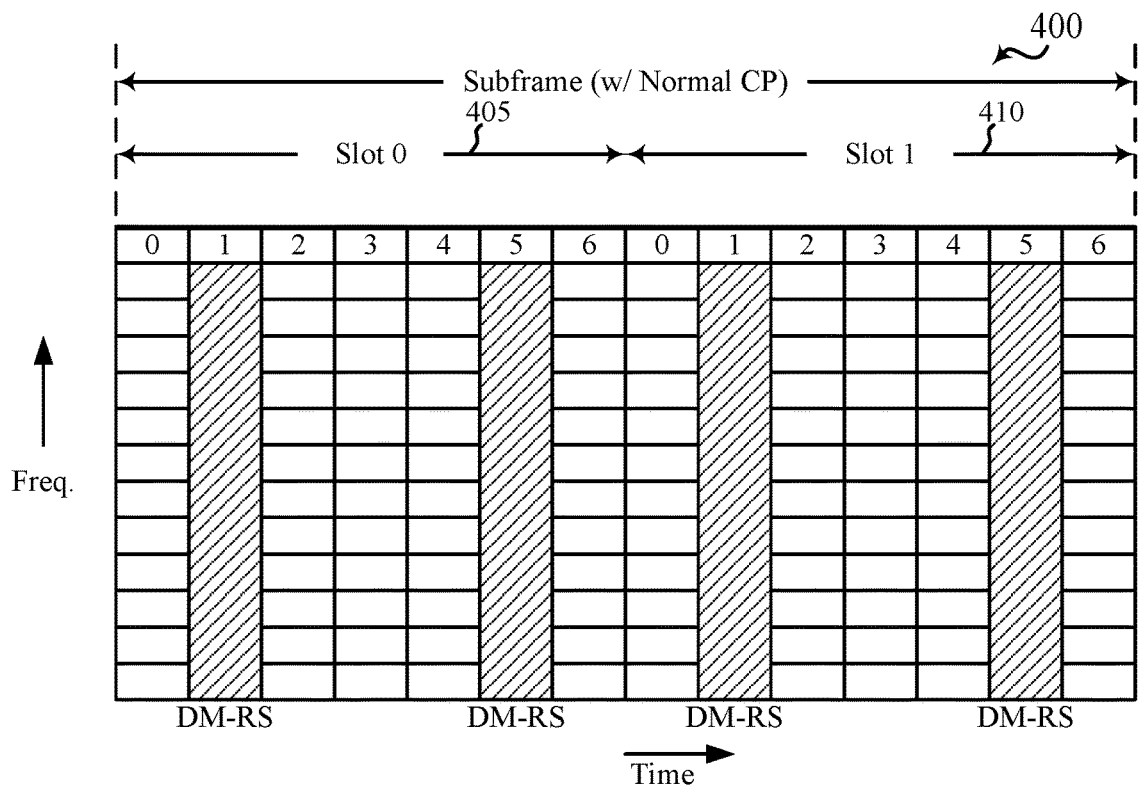
FIG. 4 shows an exemplary resource block (RB) of a PUCCH, which RB may be transmitted or received during a subframe, in accordance with various aspects of the present disclosure.

FIG. 4 shows an exemplary resource block (RB) of a PUCCH, which RB may be transmitted or received during a subframe 400, in accordance with various aspects of the present disclosure. In some examples, the RB may be transmitted by one or more of the UEs 115, 215, 215-a, 215-b, 215-c, or 315 described with reference to FIG. 1, 2, or 3, or transmitted by one or more of the base stations 105, 205, 205-a, or 305 described with reference to FIG. 1, 2, or 3. The subframe 400 includes a first slot 405 (e.g., Slot 0) and a second slot 410 (e.g., Slot 1), with each slot being configured for operation in an LTE/LTE-A normal cyclic prefix (CP) mode and including seven symbol periods numbered 0, 1, 2, 3, 4, 5, and 6. Demodulation reference signals (DM-RSs) may be transmitted in the subframe in accordance with an LTE/LTE-A PUCCH Format 3 for normal CP (e.g., during symbol periods 1 and 5 of each slot of the subframe). The present disclosure describes how a slot of the subframe 400 may be formatted for the transmission or reception of PUCCH ACK/NAK payloads of varying size.

Figure 5:
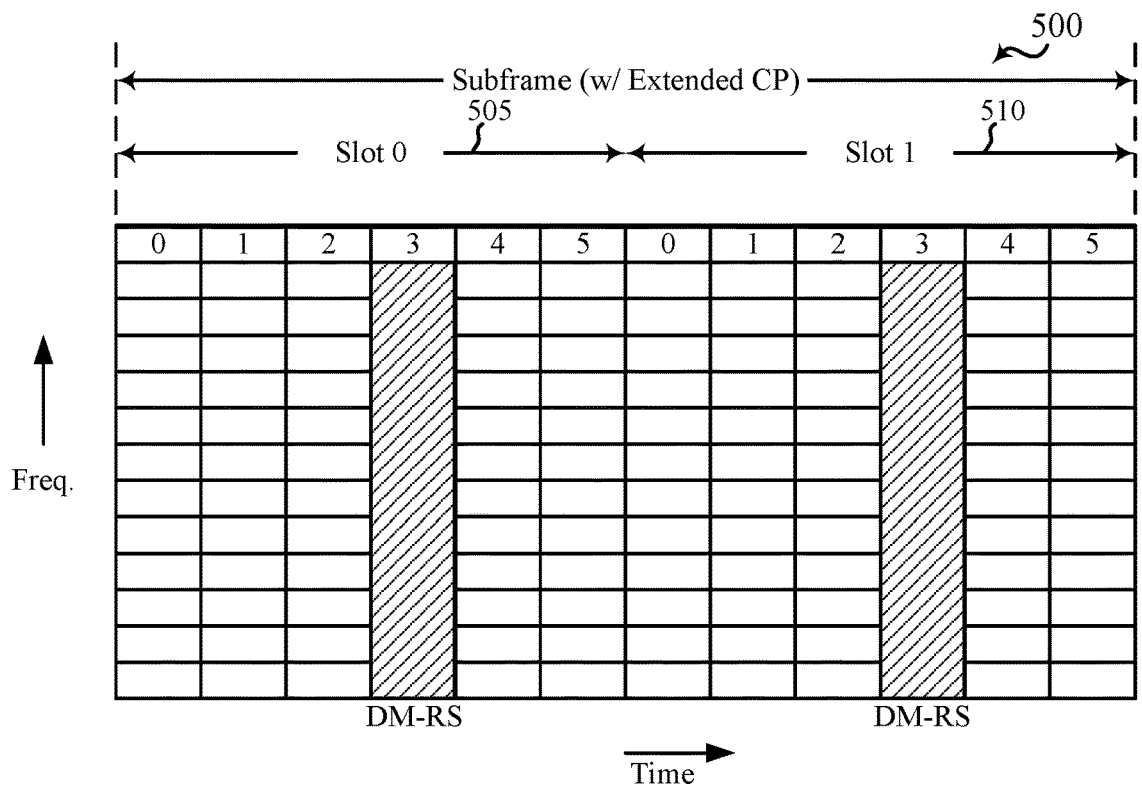
FIG. 5 shows an exemplary RB of a PUCCH, which RB may be transmitted or received during a subframe, in accordance with various aspects of the present disclosure.

FIG. 5 shows an exemplary RB of a PUCCH, which RB may be transmitted or received during a subframe 500, in accordance with various aspects of the present disclosure. In some examples, the RB may be transmitted by one or more of the UEs 115, 215, 215-a, 215-b, 215-c, or 315 described with reference to FIG. 1, 2, or 3, or transmitted by one or more of the base stations 105, 205, 205-a, or 305 described with reference to FIG. 1, 2, or 3. The subframe 500 includes a first slot 505 (e.g., Slot 0) and a second slot 510 (e.g., Slot 1), with each slot being configured for operation in an LTE/LTE-A extended CP mode and including six symbol periods numbered 0, 1, 2, 3, 4, and 5. Demodulation reference signals (DM-RSs) may be transmitted in the subframe in accordance with an LTE/LTE-A PUCCH Format 3 for extended CP (e.g., during symbol period 3 of each slot of the subframe). The present disclosure describes how a slot of the subframe 500 may be formatted for the transmission or reception of PUCCH ACK/NAK payloads of varying size.

FIGS. 6-10 describe various PHY layer designs for a PUCCH. More particularly, FIG. 6 shows an exemplary table 600 of predetermined formats of a PUCCH ACK/NAK payload, from which a format of a PUCCH ACK/NAK payload may be selected by a UE or base station, for a reporting interval, in accordance with various aspects of the present disclosure. At a UE such as one of the UEs 115, 215, 215-a, 215-b, 215-c, or 315 described with reference to FIG. 1, 2, or 3, the UE may select one of the formats for transmitting a PUCCH ACK/NAK payload for a reporting interval. At a base station such as one of the base stations 105, 205, 205-a, or 305 described with reference to FIG. 1, 2, or 3, the base station may select one of the formats for decoding the PUCCH ACK/NAK payload.

By way of example, FIG. 6 shows five exemplary formats of a PUCCH ACK/NAK payload, from which a UE or base station may select a format, for a reporting interval, based at least in part on a number of bits to be included in a PUCCH ACK/NAK payload for the reporting interval. The number of bits to be included in the PUCCH ACK/NAK payload may be determined based at least in part on a number of downlink CCs scheduled for the UE during the reporting interval. By way of example, the predefined formats for the PUCCH ACK/NAK payload may include different combinations of: UE multiplexing densities within a RB, spreading factors, or numbers of RBs allocated per symbol period.

A first format 605 of the PUCCH ACK/NAK payload may include a UE multiplexing density, within a RB, of at least four UEs (e.g., four or five UEs). In some examples, the first format may employ a Dual Reed-Muller (Dual RM) coding of its payload. The first format may be selected, for example, when the number of bits to be included in an ACK/NAK payload is 21 or fewer bits (or from 1 to 21 bits) and a RB is configured as described with reference to FIG. 4 or 5.

A second format 610 of the PUCCH ACK/NAK payload may include a UE multiplexing density, within a RB, of two UEs. The second format may also include at least two groups of symbol periods, where each of the at least two groups of symbol periods includes at least one symbol, and where spreading is applied independently within each of the at least two groups of symbol periods. In some examples, the second format may encode its payload using Tail-Biting Convolutional Coding (TBCC). The second format may be selected, for example, when the number of bits to be included in the ACK/NAK payload is 60 or fewer bits (or from 22 to 60 bits) and a RB is configured as described with reference to FIG. 4 or 5.

A third format 615 of the PUCCH ACK/NAK payload may include no UE multiplexing within a RB, no spreading factor, and an RB allocation per symbol period of one. In some examples, the third format may encode its payload using TBCC or Turbo coding. The third format may be selected, for example, when the number of bits to be included in the ACK/NAK payload is 120 or fewer bits (or from 61 to 120 bits) and a RB is configured as described with reference to FIG. 4 or 5.

A fourth format 620 of the PUCCH ACK/NAK payload may include no UE multiplexing within a RB, no spreading factor, and an RB allocation per symbol period of two. In some examples, the fourth format may encode its payload using TBCC or Turbo coding. The fourth format may be selected, for example, when the number of bits to be included in the ACK/NAK payload is 240 or fewer bits (or from 121 to 240 bits) and a RB is configured as described with reference to FIG. 4 or 5.

A fifth format 625 of the PUCCH ACK/NAK payload may include no UE multiplexing within a RB, no spreading factor, and an RB allocation per symbol period of three. In some examples, the fifth format may encode its payload using TBCC or Turbo coding. The fifth format may be selected, for example, when the number of bits to be included in the ACK/NAK payload is 360 or fewer bits (or from 241 to 360 bits) and a RB is configured as described with reference to FIG. 4 or 5.

Each format of a PUCCH ACK/NAK payload shown in FIG. 6 may have an LTE/LTE-A PUCCH Format 3 reference signal symbol structure. That is, for example, when a PUCCH ACK/NAK payload is transmitted using a normal cyclic prefix (CP), the format of the PUCCH ACK/NAK payload may have two reference signal symbol periods per slot of a subframe; and when a PUCCH ACK/NAK payload is transmitted using an extended CP, the format of the PUCCH ACK/NAK payload may have one reference signal symbol per slot of a subframe. In some examples, the reference signals transmitted in the reference signal symbol periods may include demodulation reference signals (DM-RSs).

Each format of a PUCCH ACK/NAK payload that has no spreading factor (e.g., the third format 615, the fourth format 620, and the fifth format 625) may have a data structure similar to that of a PUSCH. Processing of a PUCCH ACK/NAK payload transmitted using one of the third format 615, the fourth format 620, or the fifth format 625 may therefore be similar to the processing of an LTE/LTE-A PUSCH.

Figure 7:
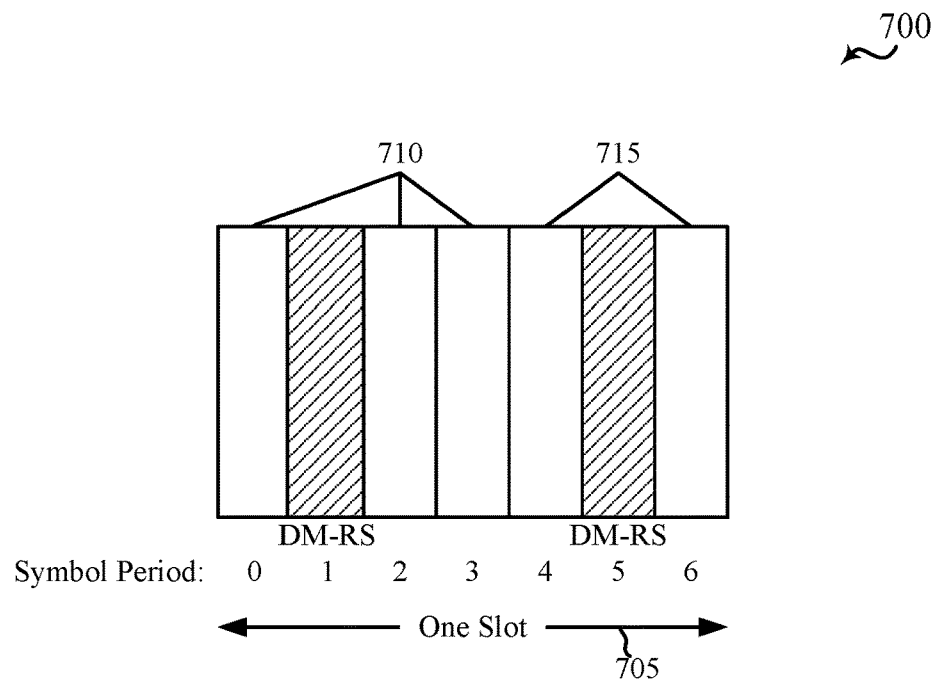
FIG. 7 shows a format of a PUCCH ACK/NAK payload in which a spreading factor of three may be applied to a first group of three symbol periods and a spreading factor of two may be applied to a second group of two symbol periods, in accordance with various aspects of the present disclosure.
Figure 8:
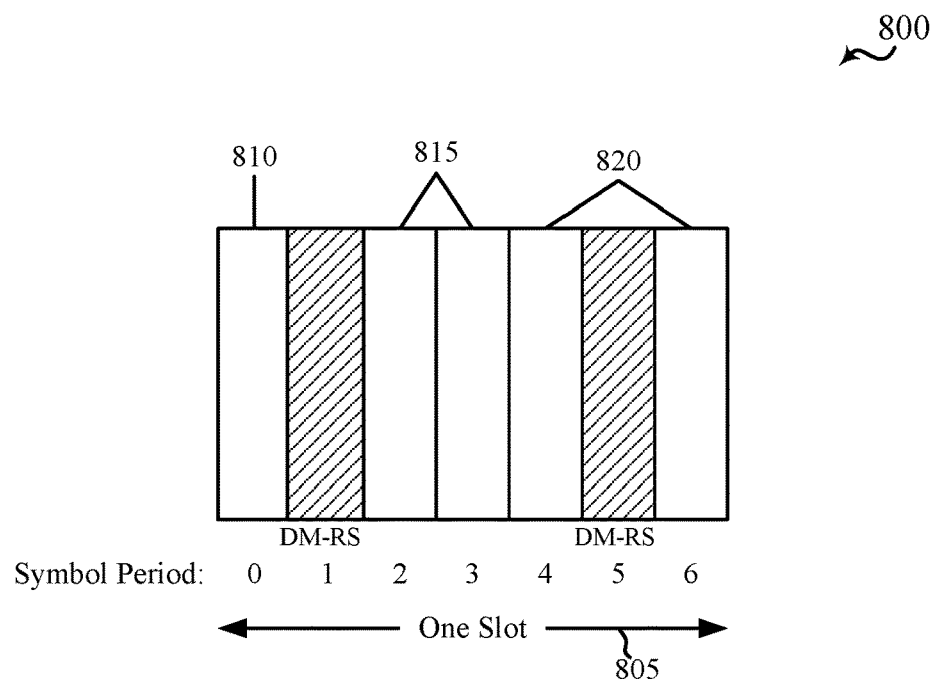
FIG. 8 shows a format of a PUCCH ACK/NAK payload in which a first spreading factor of two may be applied to a first group of one symbol period, a second spreading factor of two may be applied to a second group of two symbol periods, and a third spreading factor of two may be applied within a third group of two symbol periods, in accordance with various aspects of the present disclosure.
Figure 9:
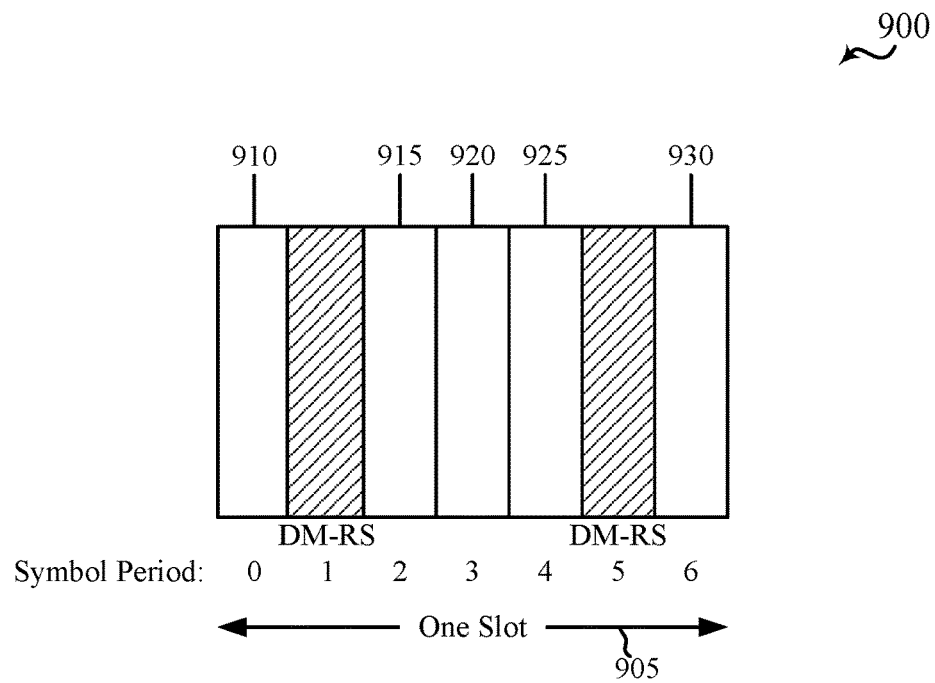
FIG. 9 shows a format of a PUCCH ACK/NAK payload in which each spreading factor of a plurality of spreading factors of two is applied to a respective groups of one symbol period, in accordance with various aspects of the present disclosure.

FIGS. 7-9 illustrate various examples of the second format 610 of a PUCCH ACK/NAK payload shown in FIG. 6. More particularly, FIG. 7 shows a format 700 of a PUCCH ACK/NAK payload in which a spreading factor of three (SF3) may be applied to a first group 710 of three symbol periods and a spreading factor of two (SF2) may be applied to a second group 715 of two symbol periods, in accordance with various aspects of the present disclosure. By way of example, the groups of symbol periods are shown to be symbol periods in a slot 705 of a subframe transmitted using a normal CP. In another example, the first group of three symbol periods and the second group of two symbol periods could be groups of symbol periods in a slot of a subframe transmitted using an extended CP.

In FIG. 7, the first group 710 of three symbol periods is shown to include symbol periods 0, 2, and 3, and the second group 715 of two symbol periods is shown to include symbol periods 4 and 6. When multiplexing the transmission of PUCCH ACK/NAK payloads for two UEs in the slot, two of three orthogonal cover codes (OCCs) may be used when applying the spreading factor of three to the symbol periods 0, 2, and 3. This reduces the maximum PUCCH ACK/NAK payload for a UE from 60 bits to 48 bits, and may result in an unequal signal-to-noise-ratio (SNR) across the coded bits of the first group 710 of three symbol periods compared to the coded bits of the second group 715 of two symbol periods.

FIG. 8 shows a format 800 of a PUCCH ACK/NAK payload in which a first spreading factor of two (SF2) may be applied to a first group 810 of one symbol period, a second spreading factor of two (SF2) may be applied to a second group 815 of two symbol periods, and a third spreading factor of two (SF2) may be applied within a third group 820 of two symbol periods, in accordance with various aspects of the present disclosure. By way of example, the groups of symbol periods are shown to be symbol periods in a slot 805 of a subframe transmitted using a normal CP. In another example, the groups could be groups of symbol periods in a slot of a subframe transmitted using an extended CP.

In FIG. 8, the first group 810 of one symbol period is shown to include symbol period 0, the second group 815 of two symbol periods is shown to include symbol periods 2 and 3, and the third group 820 of two symbol periods is shown to include symbol periods 4 and 6. The first spreading factor may be applied using a Walsh code (e.g., a block of six data symbols may be repeated once and a Walsh code W2 (e.g., [++ for a first UE, and +− for a second UE]) may be used on the repetitions for spreading before applying a Discrete Fourier Transform (DFT) to the data symbols) or using elements of an orthogonal Fast Fourier Transform (FFT) matrix (e.g., a block of six data symbols may be repeated once and a code of $$\left[1, 1, \ldots, 1; 1, e\uparrow\frac{2\pi i}{12}, e\uparrow 2*\frac{2\pi i}{12}, \ldots, e\uparrow 11*\frac{2\pi i}{12}\right]$$

may be used on the repetitions for spreading before applying a DFT to the data symbols). A more detailed illustration of applying a spreading factor of two to a symbol period using a Walsh code is described with reference to FIG. 10.

FIG. 9 shows a format 900 of a PUCCH ACK/NAK payload in which each spreading factor (SF2) of a plurality of spreading factors of two is applied to a respective groups 910, 915, 920, 925, and 930 of one symbol period, in accordance with various aspects of the present disclosure. By way of example, the groups of symbol periods are shown to be symbol periods in a slot of a subframe transmitted using a normal CP. In another example, the first group of three symbol periods and the second group of two symbol periods could be groups of symbol periods in a slot 905 of a subframe transmitted using an extended CP.

In FIG. 9, each spreading factor of two may be applied using a Walsh code (e.g., a block of six data symbols may be repeated once and a Walsh code W2 (e.g., [++ for a first UE, and +− for a second UE]) may be used on the repetitions for spreading before applying a DFT to the data symbols) or using elements of an orthogonal FFT matrix (e.g., a block of six data symbols may be repeated once and a code of $$\left[1, 1, \ldots, 1; 1, e\uparrow\frac{2\pi i}{12}, e\uparrow 2*\frac{2\pi i}{12}, \ldots, e\uparrow 11*\frac{2\pi i}{12}\right]$$

may be used on the repetitions for spreading before applying a DFT to the data symbols). A more detailed illustration of applying a spreading factor of two to a symbol period using a Walsh code is described with reference to FIG. 10.

Figure 10:
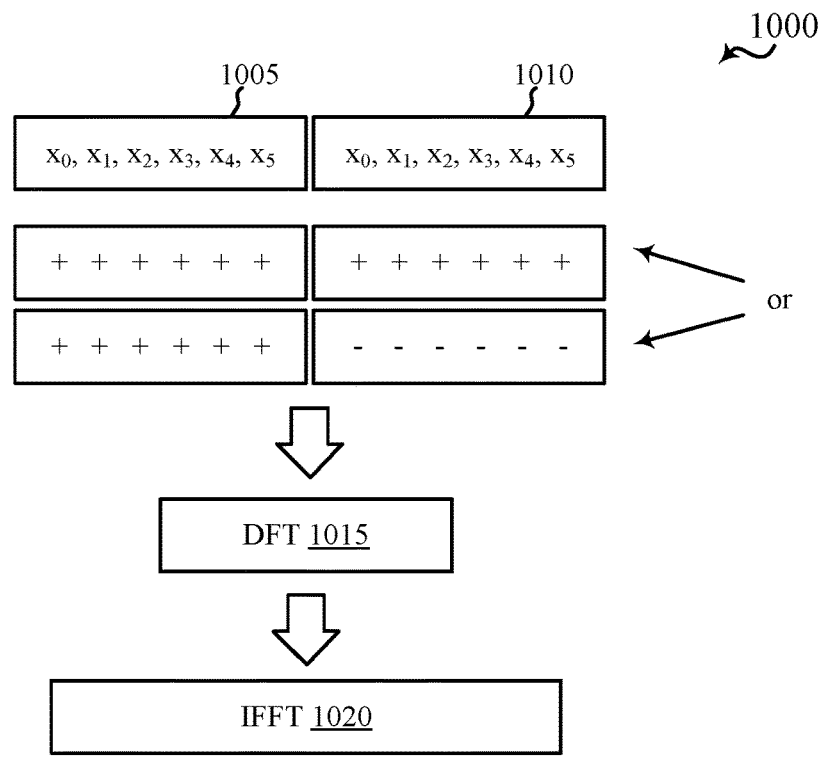
FIG. 10 shows an application of a spreading factor of two to data symbols (e.g., quadrature phase-shift keying (QPSK) symbols) within a symbol period, using a Walsh code, in accordance with various aspects of the present disclosure.

FIG. 10 shows an application of a spreading factor of two to data symbols (e.g., quadrature phase-shift keying (QPSK) symbols) within a symbol period, using a Walsh code, in accordance with various aspects of the present disclosure. The application shown may be used, for example, to apply the spreading factor of two to the first group of one symbol period described with reference to FIG. 8 or, individually, to any of the groups of one symbol period described with reference to FIG. 9.

As shown in FIG. 10, a block 1005 of six data symbols (e.g., QPSK symbols $x_0, x_1, x_2, x_3, x_4, x_5$) may be repeated once (as block 1010) and a Walsh code W2 (e.g., [++ for a first UE, and +− for a second UE]) may be used on the repetitions for spreading before applying a DFT 1015 to the data symbols). Tone mapping may then be performed using an Inverse FFT (IFFT) 1020.

With reference to the first format 605 of a PUCCH ACK/NAK payload, described with reference to FIG. 6, orthogonal resources may be allocated for each antenna port of a UE. With reference to the second format 610, third format 615, fourth format 620, or fifth format 625 of a PUCCH ACK/NAK payload, described with reference to FIG. 6, 7, 8, or 9, a space-time block code (STBC) may be used for transmission diversity (TxDiv). Use of an SBTC involves no special handling for symbol period groups of one symbol period. When using SBTC, and in some examples, four orthogonal DM-RS resources may be allocated for the second format 610 of a PUCCH ACK/NAK payload, and two orthogonal DM-RS resources may be allocated for the third format 615, fourth format 620, or fifth format 625 of a PUCCH ACK/NAK payload.

As an example of using SBTC, assume that without TxDiv, the transmitted SC-FDM data symbols would be [$Y_0, Y_1, Y_2, Y_3, Y_4$] (ignoring DM-RS symbol periods). With TxDiv using SBTC, the transmitted SC-FDM data symbols may be, for example, [$Y_0, Y_1^*, Y_2, Y_3^*, Y_4$] for Antenna port 0, and [$Y_1, -Y_0^*, Y_3, -Y_2^*, Y_4$] for Antenna port 1.

The PHY layer designs for a PUCCH described in FIGS. 6-10, and elsewhere in the present disclosure, may be extended to PUCCH higher order modulation (e.g., 16 quadrature amplitude modulation (QAM)) or MIMO. In a MIMO context, multiple DM-RS resources per UE may be appropriate (e.g., similar to what was described above in the context of TxDiv). Higher order modulation and MIMO can increase the supportable PUCCH ACK/NAK payload without reducing UE multiplexing density.

In some examples, the downlink CCs allocated to a UE may be grouped into two or more subsets for the purpose of feedback reporting (e.g., for the purpose of ACK/NAK reporting). A number of bits to be included in a PUCCH ACK/NAK, payload for each group of downlink CCs may then be determined for a reporting interval, based at least in part on the number of downlink CCs in scheduled for the UE during the reporting interval; and based at least in part on the determined number of bits for each subset, a format of a PUCCH ACK/NAK payload for the subset may be selected. In some examples, the format of each PUCCH ACK/NAK payload may be selected from a set of predefined formats such as the set of formats described with reference to FIG. 6. A separate set of resources may be allocated for each PUCCH ACK/NAK payload.

In some examples, a first PUCCH ACK/NAK payload for a first group of downlink CCs may be transmitted on a first uplink CC, and an additional PUCCH ACK/NAK payload (e.g., a second ACK/NAK payload) for an additional group of downlink CCs (e.g., a second group of downlink CCs) may be transmitted on a second uplink CC. Alternatively, the first PUCCH ACK/NAK payload and the additional PUCCH ACK/NAK payload (e.g., the second ACK/NAK payload) may be transmitted on a same uplink CC. When different uplink CCs are used to transmit different PUCCH ACK/NAK payloads, the PUCCH design may be similar to that of a PUCCH transmitted on a secondary cell (SCell) in a dual connectivity scenario (but possibly with more than two groups of downlink CCs). When the same uplink CC is used to transmit different PUCCH ACK/NAK payloads, the PUCCH ACK/NAK payloads may be transmitted using a non-SC-FDM waveform. In some examples, the transmission of different PUCCH ACK/NAK payloads on the same uplink CC may be supported for formats of PUCCH ACK/NAK payload limited to one RB (e.g., the first format 605, the second format 610, and the third format 615 described with reference to FIG. 6).

In some examples, downlink assignment indices (DAIs) may be used for bit mapping and resource selection within a PUCCH ACK/NAK payload. For example, a DAI may be associated (e.g., transmitted) with each of a number of downlink grants transmitted to a UE. The downlink grants may indicate the downlink CCs scheduled for a UE, and the DAI for a downlink grant may indicate a bit mapping and resource selection, in a PUCCH ACK/NAK payload, for acknowledging/non-acknowledging each transmission over each downlink CC scheduled in the downlink grant. In the case of self-scheduling (i.e., same-CC scheduling), each downlink CC may be associated with a unique DAI. In the case of cross-CC scheduling, a DAI per grant may apply to multiple downlink CCs, and a DAI for each of the multiple downlink CCs may be implicitly derived. In some examples, a DAI may indicate a bit location across CCs and subframes. In another example, a DAI for a downlink grant may include a sequence number indicating a relationship between at least one downlink CC scheduled in the downlink grant and at least one downlink CC scheduled in another downlink grant. In these examples, a bit mapping and resource selection for acknowledging/non-acknowledging a downlink CC (or downlink CCs) in a PUCCH ACK/NAK payload may be determined based at least in part on the sequence number. In some examples, the sequence number may be a number generated by an n-bit counter, where n is incremented across CCs first and subframes second, with a cyclic wrap-around.

Bit mapping may directly follow DAI processing when the DAI is an absolute ACK/NAK bit location indicator. Bit mapping may follow DAI processing, including unwrapping, when the DAI includes a sequence number.

When a DAI includes a sequence number, the set of sequence numbers received by a UE for a reporting interval may be used to determine the total number of downlink CCs, N, that are scheduled for the UE in the reporting interval. In the case of MIMO use, a UE may select the smallest PUCCH ACK/NAK payload format that supports 2N bits. In some examples, RRC-configured bundling for sets of downlink CCs or subframes may be factored into the N or 2N numbers. The omission of feedback for some downlink CCs may also be factored into the N or 2N numbers.

In some cases, a UE may not receive or properly decode one or more downlink grants. When a non-received or improperly decoded downlink grant is transmitted to the UE before another downlink grant, which other downlink grant is received by the UE and associated with a sequence number following the sequence number of the non-received or improperly decoded downlink grant, the UE may use the sequence number(s) it receives to determine how many downlink grants it should have received and, in some cases, select the correct PUCCH ACK/NAK payload format based on a determination of the number of bits that the UE is supposed to acknowledge/non-acknowledge in the PUCCH ACK/NAK payload. However, when a non-received or improperly decoded downlink grant is transmitted to the UE after all other downlink grants, the UE may select an incorrect PUCCH ACK/NAK payload format that supports a smaller size payload (e.g., based on the UE's determination of a smaller value for N or 2N). To mitigate such an incorrect determination, and the ambiguity that might result from selecting an unexpected PUCCH ACK/NAK payload format, a base station may introduce sequence discontinuities into the sequence numbers associated with a plurality of DAIs. The sequence discontinuities may serve to pad the sequence numbers, such that a UE will be caused to determine a value of N or 2N that is large enough to cause selection of the appropriate PUCCH ACK/NAK format—even when one or more last-transmitted downlink grants are not received and the UE therefore determines an incorrect value of N or 2N. For example, in the absence of introducing sequence number discontinuities, a base station may associate DAI values (before modulo operation) of [0, 2, 4, 6, 8, 10, 12, 14, 16, 18, 20] with 11 separate MIMO downlink grants transmitted to a UE. If the UE receives all but the last downlink grant, the UE may determine N=10 and incorrectly select the first format 105 described with reference to FIG. 1. However, if the base station associates DAI values (before module operation) of [0, 2, 6, 8, 10, 12, 16, 18, 20, 22, 24] with the 11 separate MIMO downlink grants, the UE would determine N=11 and correctly select the second format 110 described with reference to FIG. 1 (even though the correct value of N was N=12).

When introducing sequence discontinuities into (or padding) a set of sequence numbers, a base station knows where the sequence discontinuities are introduced, and thus can expect NAKs for the PUCCH ACK/NAK payload bit positions corresponding to the sequence discontinuities. Given this expectation, the base station can use the introduced sequence discontinuities as a virtual cyclic redundancy check (CRC). A base station may also introduce additional sequence discontinuities for the purpose of increasing the length of the CRC.

In some examples, a base station may associate an ACK/NAK Resource Indicator (ARI) with each downlink grant transmitted to a UE. In some examples, each ARI may be a 4-bit value indicating which of sixteen different PUCCH resources are to be used for ACK/NAK reporting. In some cases, the different PUCCH resources may be associated with different uplink CCs (e.g., 10 PUCCH resources may be configured on an uplink CC1 and PUCCH resources may be configured on an uplink CC2). Each of the PUCCH resources may be configured (or may be expected to be configured) using the same PUCCH ACK/NAK format.

In some examples, an ARI may have a variable length, so that the length of the ARI may be tailored to the number of downlink CCs that are scheduled for a UE during a reporting interval. For example, when a UE is scheduled on 8 downlink CCs with 8 downlink grants, each of the first four downlink grants may be associated with an ARI value of a, and each of the second four downlink grants may be associated with an ARI value of b. Upon the UE detecting the change in ARI value, the UE may concatenate the ARI values in order of CC identity (CC_ID) to derive the 8-bit value ab. Unless the UE fails to receive four consecutive downlink grants, the appropriate PUCCH resource will be used.

Figure 11:
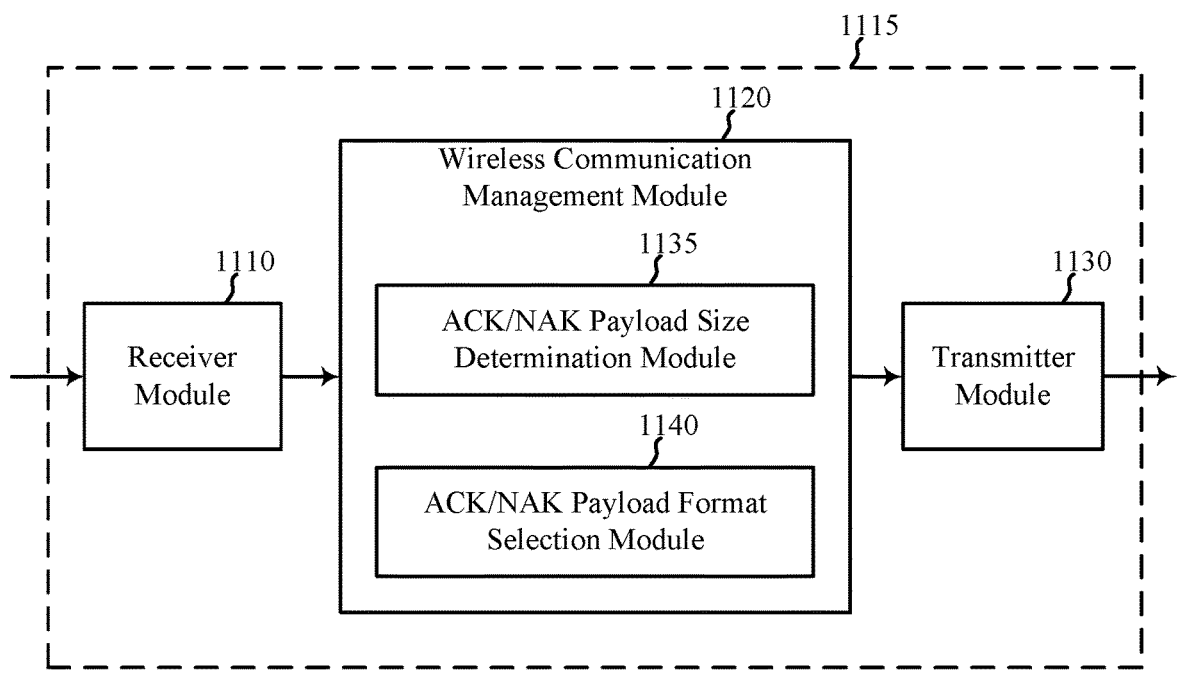
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 1115 may be an example of aspects of one or more of the UEs 115, 215, 215-*a*, 215-*b*, 215-*c*, or 315 described with reference to FIG. 1, 2, or 3, or aspects of one or more of the base stations 105, 205, 205-*a*, or 305 described with reference to FIG. 1, 2, or 3. The apparatus 1115 may also be or include a processor. The apparatus 1115 may include a receiver module 1110, a wireless communication management module 1120, or a transmitter module 1130. Each of these modules may be in communication with each other.

The modules of the apparatus 1115 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one radio frequency (RF) receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1110 may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1130 may include at least one RF transmitter, such as at least one RF transmitter operable to transmit over the dedicated radio frequency spectrum or the shared radio frequency spectrum. The transmitter module 1130 may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the wireless communication management module 1120 may be used to manage one or more aspects of wireless communication for the apparatus 1115. In some examples, the wireless communication management module 1120 may include an ACK/NAK payload size determination module 1135 or an ACK/NAK payload format selection module 1140.

In some examples, the ACK/NAK payload size determination module 1135 may be used to determine, based at least in part on a number of downlink CCs scheduled for a UE during a reporting interval, a number of bits to be included in a PUCCH ACK/NAK payload for the reporting interval.

In some examples, the ACK/NAK payload format selection module 1140 may be used to select, based at least in part on the determined number of bits, a format of the PUCCH ACK/NAK payload.

In some examples of the apparatus 1115, the ACK/NAK payload format selection module 1140 may select the format of the PUCCH ACK/NAK payload by selecting one of a plurality of predefined formats for the PUCCH ACK/NAK payload. The predefined formats for the PUCCH ACK/NAK payload may include, for example, different combinations of: UE multiplexing densities within a RB, spreading factors, or numbers of RBs allocated per symbol period. In some examples, each of the predefined formats for the PUCCH ACK/NAK payload may be based at least in part on a format including two reference signal symbol periods per slot (e.g., when the predefined formats are configured for transmissions, in a slot of a subframe, with a normal CP). In some examples, each of the predefined formats for the PUCCH ACK/NAK payload may be based at least in part on a format including one reference signal symbol period per slot (e.g., when the predefined formats are configured for transmissions, in a slot of a subframe, with an extended CP).

In examples in which the apparatus 1115 is included in a UE, the wireless communication management module 1120 may receive a number of downlink grants indicating the downlink CCs scheduled for the UE. In these examples, the ACK/NAK payload format selection module 1140 may select a PUCCH ACK/NAK payload format for transmitting the PUCCH ACK/NAK payload.

In examples in which the apparatus 1115 is included in a base station, the wireless communication management module 1120 may transmit, to a UE, a plurality of downlink grants indicating the downlink CCs scheduled for the UE. In these examples, the ACK/NAK payload format selection module 1140 may select a PUCCH ACK/NAK payload format for decoding the PUCCH ACK/NAK payload.

Figure 12:
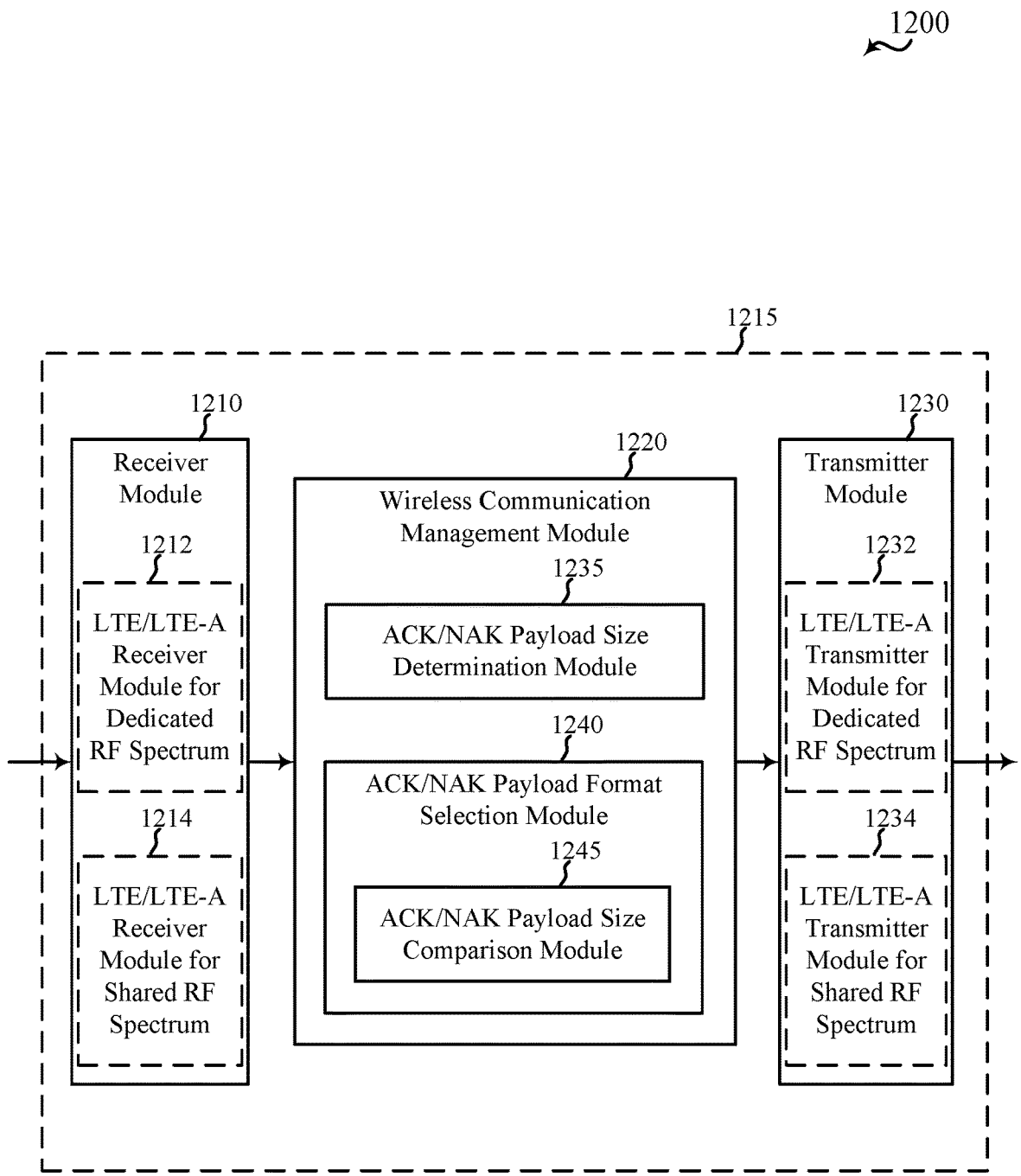
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-*a*, 215-*b*, 215-*c*, or 315 described with reference to FIG. 1, 2, or 3, aspects of one or more of the base stations 105, 205, 205-*a*, or 305 described with reference to FIG. 1, 2, or 3, or aspects of the apparatus 1115 described with reference to FIG. 11. The apparatus 1215 may also be or include a processor. The apparatus 1215 may include a receiver module 1210, a wireless communication management module 1220, or a transmitter module 1230. Each of these modules may be in communication with each other.

The modules of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1210 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1210 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1212), and an LTE/LTE-A receiver module for communicating over the shared radio frequency spectrum (e.g., LTE/LTE-A receiver module for shared RF spectrum 1214). The receiver module 1210, including the LTE/LTE-A receiver module for dedicated RF spectrum 1212 or the LTE/LTE-A receiver module for shared RF spectrum 1214, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1230 may include at least one RF transmitter, such as at least one RF transmitter operable to transmit over the dedicated radio frequency spectrum or the shared radio frequency spectrum. The transmitter module 1230 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1232), and an LTE/LTE-A transmitter module for communicating over the shared radio frequency spectrum (e.g., LTE/LTE-A transmitter module for shared RF spectrum 1234). The transmitter module 1230, including the LTE/LTE-A transmitter module for dedicated RF spectrum 1232 or the LTE/LTE-A transmitter module for shared RF spectrum 1234, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum or the second radio frequency spectrum.

In some examples, the wireless communication management module 1220 may be used to manage one or more aspects of wireless communication for the apparatus 1215. In some examples, the wireless communication management module 1220 may include an ACK/NAK payload size determination module 1235 or an ACK/NAK payload format selection module 1240.

In some examples, the ACK/NAK payload size determination module 1235 may be used to determine, based at least in part on a number of downlink CCs scheduled for a UE during a reporting interval, a number of bits to be included in a PUCCH ACK/NAK payload for the reporting interval.

In some examples, the ACK/NAK payload format selection module 1240 may include a ACK/NAK payload size comparison module 1245. The ACK/NAK payload size comparison module 1245 may be used to compare the number of bits to be included in the PUCCH ACK/NAK payload to a plurality of bit ranges. The ACK/NAK payload format selection module 1240 may then select a format of the PUCCH ACK/NAK payload based at least in part on the comparison performed by the ACK/NAK payload size comparison module 1245. In some examples, the selected format of the PUCCH ACK/NAK payload may be based at least in part on a format including two reference signal symbol periods per slot of a subframe.

In some examples, the format of the PUCCH ACK/NAK payload selected by the ACK/NAK payload format selection module 1240 may be based at least in part on a format including two reference signal symbol periods per slot (e.g., when the selected format is for a transmission, in a slot of a subframe, with a normal CP). In some examples, the format of the PUCCH ACK/NAK payload selected by the ACK/NAK payload format selection module 1240 may be based at least in part on a format including one reference signal symbol period per slot (e.g., when the selected format is for a transmission, in a slot of a subframe, with an extended CP).

In some examples, the format of the PUCCH ACK/NAK payload selected by the ACK/NAK payload format selection module 1240 may include a UE multiplexing density, within a RB, of at least four UEs (e.g., four or five UEs). Such a format (i.e., a first format) may be selected, for example, when the number of bits to be included in the ACK/NAK payload is 21 or fewer bits (or from 1 to 21 bits) and a RB is configured as described with reference to FIG. 4 or 5.

In some examples, the format of the PUCCH ACK/NAK payload selected by the ACK/NAK payload format selection module 1240 may include a UE multiplexing density, within a RB, of two UEs. The selected format may also include at least two groups of symbol periods, where each of the at least two groups of symbol periods includes at least one symbol, and where spreading is applied independently within each of the at least two groups of symbol periods. Such a format (i.e., a second format) may be selected, for example, when the number of bits to be included in the ACK/NAK payload is 60 or fewer bits (or from 22 to 60 bits) and a RB is configured as described with reference to FIG. 4 or 5.

In a first example of the second format, a spreading factor of three may be applied to a first group of three symbol periods and a spreading factor of two may be applied to a second group of two symbol periods, and two of three OCCs may be used when applying the spreading factor of three. In a second example of the second format, a first spreading factor of two may be applied to a first group of one symbol period, a second spreading factor of two may be applied to a second group of two symbol periods, and a third spreading factor of two may be applied within a third group of two symbol periods. In the second example of the second format, the first spreading factor may be applied using a Walsh code or using elements of an orthogonal FFT matrix. In a third example of the second format, each spreading factor of a plurality of spreading factors of two may be applied to a respective symbol period of a plurality of symbol periods. In the third example of the second format, each spreading factor of the plurality of spreading factors of two may be applied using a Walsh code or using elements of an orthogonal FFT matrix.

In some examples, the format of the PUCCH ACK/NAK payload selected by the ACK/NAK payload format selection module 1240 may include no UE multiplexing within a RB, no spreading factor, and an RB allocation per symbol period of one. Such a format (i.e., a third format) may be selected, for example, when the number of bits to be included in the ACK/NAK payload is 120 or fewer bits (or from 61 to 120 bits) and a RB is configured as described with reference to FIG. 4 or 5.

In some examples, the format of the PUCCH ACK/NAK payload selected by the ACK/NAK payload format selection module 1240 may include no UE multiplexing within a RB, no spreading factor, and an RB allocation per symbol period of two. Such a format (i.e., a fourth format) may be selected, for example, when the number of bits to be included in the ACK/NAK payload is 240 or fewer bits (or from 121 to 240 bits) and a RB is configured as described with reference to FIG. 4 or 5.

In some examples, the format of the PUCCH ACK/NAK payload selected by the ACK/NAK payload format selection module 1240 may include no UE multiplexing within a RB, no spreading factor, and an RB allocation per symbol period of three. Such a format (i.e., a fifth format) may be selected, for example, when the number of bits to be included in the ACK/NAK payload is 360 or fewer bits (or from 241 to 360 bits) and a RB is configured as described with reference to FIG. 4 or 5.

Figure 13:
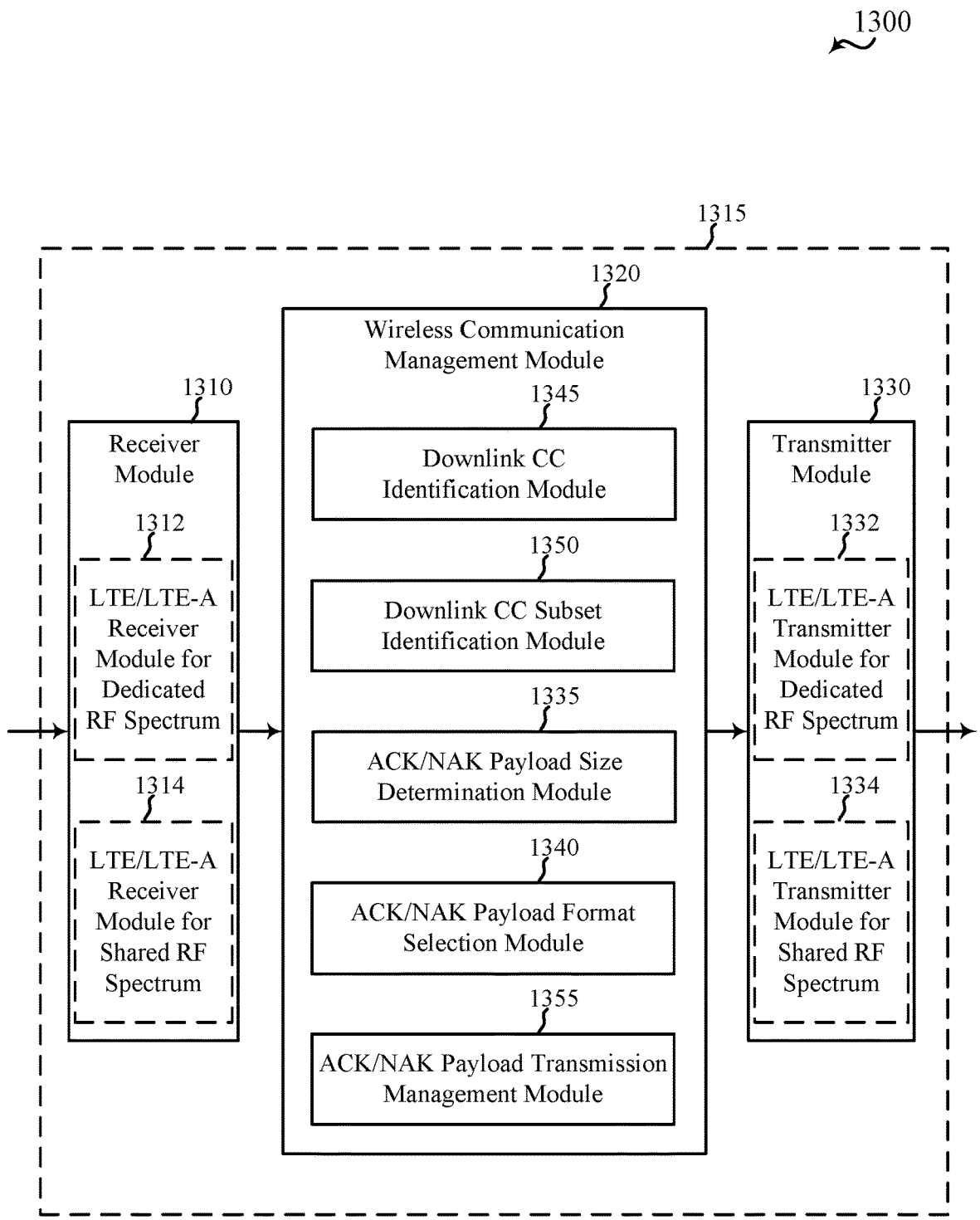
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115, 215, 215-*a*, 215-*b*, 215-*c*, or 315 described with reference to FIG. 1, 2, or 3, or aspects of the apparatus 1115 or 1215 described with reference to FIG. 11 or 12. The apparatus 1315 may also be or include a processor. The apparatus 1315 may include a receiver module 1310, a wireless communication management module 1320, or a transmitter module 1330. Each of these modules may be in communication with each other.

The modules of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1310 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1310 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1312), and an LTE/LTE-A receiver module for communicating over the shared radio frequency spectrum (e.g., LTE/LTE-A receiver module for shared RF spectrum 1314). The receiver module 1310, including the LTE/LTE-A receiver module for dedicated RF spectrum 1312 or the LTE/LTE-A receiver module for shared RF spectrum 1314, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1330 may include at least one RF transmitter, such as at least one RF transmitter operable to transmit over the dedicated radio frequency spectrum or the shared radio frequency spectrum. The transmitter module 1330 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1332), and an LTE/LTE-A transmitter module for communicating over the shared radio frequency spectrum (e.g., LTE/LTE-A transmitter module for shared RF spectrum 1334). The transmitter module 1330, including the LTE/LTE-A transmitter module for dedicated RF spectrum 1332 or the LTE/LTE-A transmitter module for shared RF spectrum 1334, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum or the second radio frequency spectrum.

In some examples, the wireless communication management module 1320 may be used to manage one or more aspects of wireless communication for the apparatus 1315. In some examples, the wireless communication management module 1320 may include a downlink CC identification module 1345, a downlink CC subset identification module 1350, an ACK/NAK payload size determination module 1335, an ACK/NAK payload format selection module 1340, or an ACK/NAK payload transmission management module 1355.

In some examples, the downlink CC identification module 1345 may be used to identify an allocation of a plurality of downlink CCs for a UE.

In some examples, the downlink CC subset identification module 1350 may be used to identify at least a first subset of downlink CCs within the plurality of downlink CCs. Additional subsets of downlink CCs may also be identified (e.g., a second subset of downlink CCs, etc.).

In some examples, the ACK/NAK payload size determination module 1335 may be used to determine, based at least in part on a number of downlink CCs in the first subset of downlink CCs that are scheduled for the UE during a reporting interval, a number of bits to be included in a first PUCCH ACK/NAK payload for the reporting interval. The ACK/NAK payload size determination module 1335 may also be used to determine, based at least in part on a number of downlink CCs in each of one or more additional subsets of downlink CCs that are scheduled for the UE during a reporting interval (e.g., for the second subset of downlink CCs), a number of bits to be included in each of the one or more additional PUCCH ACK/NAK payloads (e.g., a second PUCCH ACK/NAK payload) for the reporting interval.

In some examples, the ACK/NAK payload format selection module 1340 may be used to select, based at least in part on the determined number of bits for the first PUCCH ACK/NAK payload, a format of the first PUCCH ACK/NAK payload. The ACK/NAK payload format selection module 1340 may also be used to select, based at least in part on the determined number of bits for the PUCCH ACK/NAK payload(s) of each of the one or more additional subsets of downlink CCs (e.g., the second subset of downlink CCs), a format of each of the one or more additional PUCCH ACK/NAK payloads (e.g., the second PUCCH ACK/NAK payload).

In some examples, the ACK/NAK payload transmission management module 1355 may be used to transmit the first PUCCH ACK/NAK payload on a first uplink CC, and transmit an additional PUCCH ACK/NAK payload (e.g., the second ACK/NAK payload) on a second uplink CC. Alternatively, the ACK/NAK payload transmission management module 1355 may be used to transmit the first PUCCH ACK/NAK payload and an additional ACK/NAK payload (e.g., the second ACK/NAK payload) on a same uplink CC.

Figure 14:
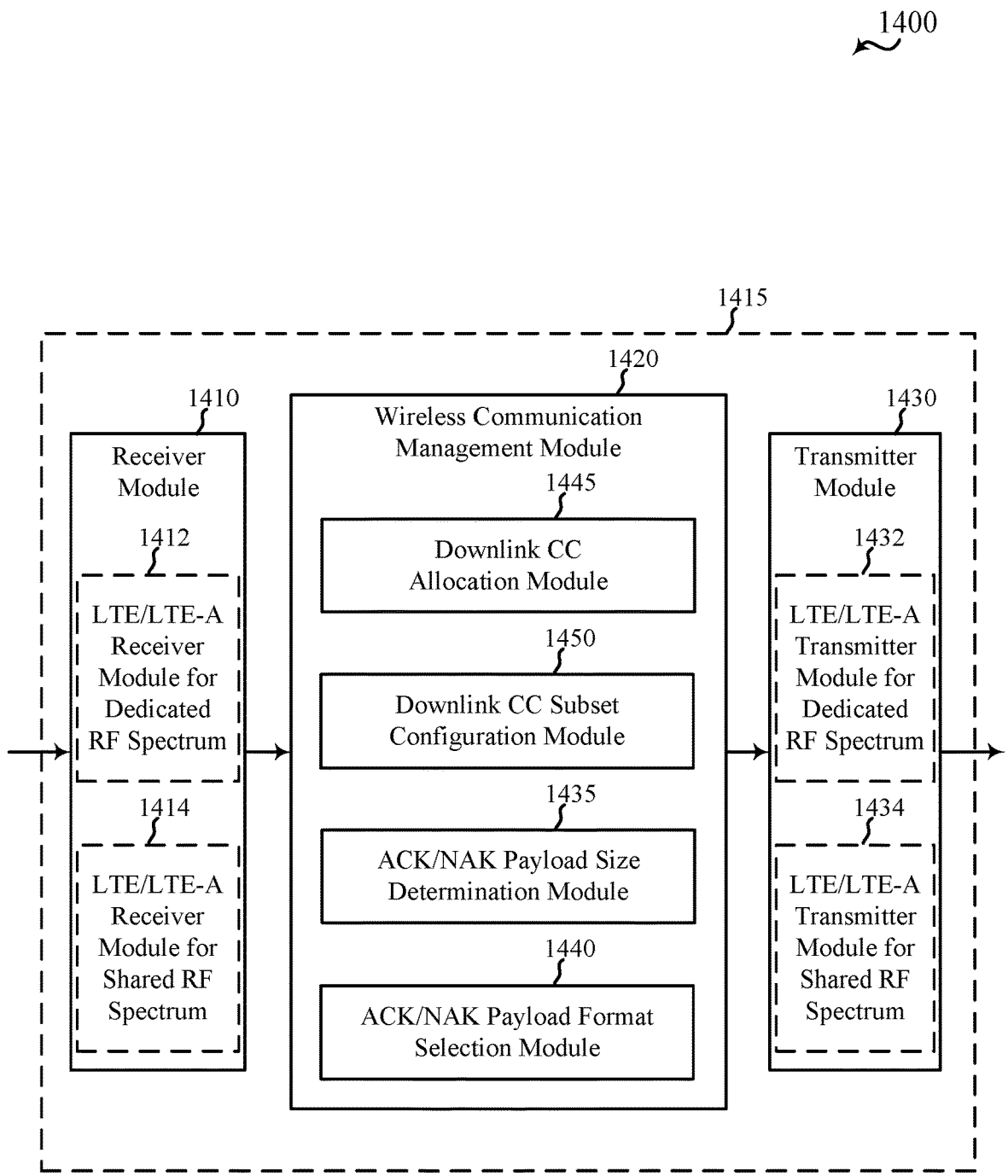
FIG. 14 shows a block diagram of an apparatus for use in wireless communication, in accordance with various aspects of the present disclosure.

FIG. 14 shows a block diagram 1400 of an apparatus 1415 for use in wireless communication, in accordance with various aspects of the present disclosure. The apparatus 1415 may be an example of aspects of one or more of the base stations 105, 205, 205-a, or 305 described with reference to FIG. 1, 2, or 3, or aspects of the apparatus 1115 or 1215 described with reference to FIG. 11 or 12. The apparatus 1415 may also be or include a processor. The apparatus 1415 may include a receiver module 1410, a wireless communication management module 1420, or a transmitter module 1430. Each of these modules may be in communication with each other.

The modules of the apparatus 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1410 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1410 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1412), and an LTE/LTE-A receiver module for communicating over the shared radio frequency spectrum (e.g., LTE/LTE-A receiver module for shared RF spectrum 1414). The receiver module 1410, including the LTE/LTE-A receiver module for dedicated RF spectrum 1412 or the LTE/LTE-A receiver module for shared RF spectrum 1414, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1430 may include at least one RF transmitter, such as at least one RF transmitter operable to transmit over the dedicated radio frequency spectrum or the shared radio frequency spectrum. The transmitter module 1430 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1432), and an LTE/LTE-A transmitter module for communicating over the shared radio frequency spectrum (e.g., LTE/LTE-A transmitter module for shared RF spectrum 1434). The transmitter module 1430, including the LTE/LTE-A transmitter module for dedicated RF spectrum 1432 or the LTE/LTE-A transmitter module for shared RF spectrum 1434, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum or the second radio frequency spectrum.

In some examples, the wireless communication management module 1420 may be used to manage one or more aspects of wireless communication for the apparatus 1415. In some examples, the wireless communication management module 1420 may include a downlink CC allocation module 1445, a downlink CC subset configuration module 1450, an ACK/NAK payload size determination module 1435, or an ACK/NAK payload format selection module 1440.

In some examples, the downlink CC allocation module 1445 may be used to allocate a plurality of downlink CCs for a UE.

In some examples, the downlink CC subset configuration module 1450 may be used to configure at least two groups of downlink CCs (e.g., configure at least a first subset of downlink CCs and a second subset of downlink CCs within the plurality of downlink CCs).

In some examples, the ACK/NAK payload size determination module 1435 may be used to determine, for each group of downlink CCs, and based at least in part on a number of downlink CCs that are scheduled for the UE during a reporting interval, a number of bits to be included in a PUCCH ACK/NAK payload for the group of downlink CCs for the reporting interval. Thus, for example, a first number of bits to be included in a first PUCCH ACK/NAK payload for a first group of downlink CCs may be determined, and a second number of bits to be included in a second PUCCH ACK/NAK payload for a second group of downlink CCs may be determined.

In some examples, the ACK/NAK payload format selection module 1440 may be used to select, for each PUCCH ACK/NAK payload, and based at least in part on the determined number of bits for the PUCCH ACK/NAK payload, a format of the first PUCCH ACK/NAK payload. That is, a format of a PUCCH ACK/NAK payload may be selected for each of the at least two groups of downlink CCs. Also or alternatively, a format of a PUCCH ACK/NAK payload may be selected considering bundling of ACK/NAK bits for the downlink CCs within each of the at least two groups of downlink CCs.

Figure 15:
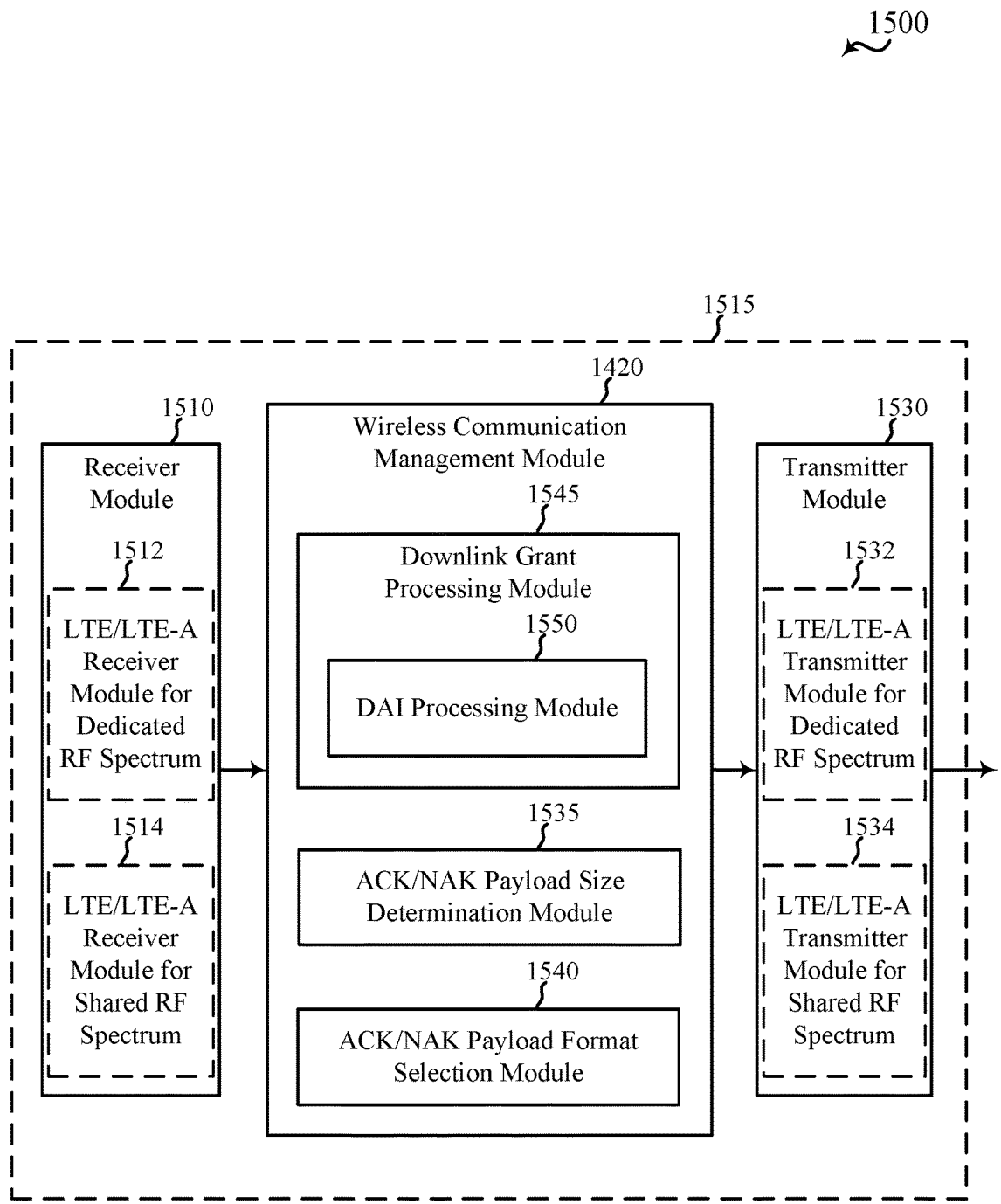
FIG. 15 shows a block diagram of an apparatus for use in wireless communication, in accordance with various aspects of the present disclosure.

FIG. 15 shows a block diagram 1500 of an apparatus 1515 for use in wireless communication, in accordance with various aspects of the present disclosure. The apparatus 1515 may be an example of aspects of one or more of the UEs 115, 215, 215-a, 215-b, 215-c, or 315 described with reference to FIG. 1, 2, or 3, or aspects of the apparatus 1115, 1215, or 1315 described with reference to FIG. 11, 12, or 13. The apparatus 1515 may also be or include a processor. The apparatus 1515 may include a receiver module 1510, a wireless communication management module 1520, or a transmitter module 1530. Each of these modules may be in communication with each other.

The modules of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1510 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1510 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1512), and an LTE/LTE-A receiver module for communicating over the shared radio frequency spectrum (e.g., LTE/LTE-A receiver module for shared RF spectrum 1514). The receiver module 1510, including the LTE/LTE-A receiver module for dedicated RF spectrum 1512 or the LTE/LTE-A receiver module for shared RF spectrum 1514, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1530 may include at least one RF transmitter, such as at least one RF transmitter operable to transmit over the dedicated radio frequency spectrum or the shared radio frequency spectrum. The transmitter module 1530 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1532), and an LTE/LTE-A transmitter module for communicating over the shared radio frequency spectrum (e.g., LTE/LTE-A transmitter module for shared RF spectrum 1534). The transmitter module 1530, including the LTE/LTE-A transmitter module for dedicated RF spectrum 1532 or the LTE/LTE-A transmitter module for shared RF spectrum 1534, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum or the second radio frequency spectrum.

In some examples, the wireless communication management module 1520 may be used to manage one or more aspects of wireless communication for the apparatus 1515. In some examples, the wireless communication management module 1520 may include a downlink grant processing module 1545, an ACK/NAK payload size determination module 1535, or an ACK/NAK payload format selection module 1540.

In some examples, the downlink grant processing module 1545 may be used to receive a number of downlink grants indicating the downlink CCs scheduled for a UE, and to receive with each of the downlink grants a respective DAI. The downlink grant processing module 1545 may include a DAI processing module 1550 that may be used to receive the DAI(s).

In some examples, the ACK/NAK payload size determination module 1535 may be used to determine, based at least in part on a number of downlink CCs scheduled for the UE during a reporting interval, a number of bits to be included in a PUCCH ACK/NAK payload for the reporting interval.

In some examples, the ACK/NAK payload format selection module 1540 may be used to select, based at least in part on the determined number of bits, a format of the PUCCH ACK/NAK payload.

In some examples of the apparatus 1515, the respective DAI for a downlink grant may indicate a bit mapping and resource selection, in the PUCCH ACK/NAK payload, for acknowledging/non-acknowledging each transmission over each downlink CC scheduled in the downlink grant.

In some examples of the apparatus 1515, the respective DAI for a downlink grant may include a sequence number indicating a relationship between at least one downlink CC scheduled in the downlink grant and at least one downlink CC scheduled in another downlink grant. In these examples, the DAI processing module 1550 may determine, based at least in part on the sequence number, a bit mapping and resource selection, in the PUCCH ACK/NAK payload, for acknowledging/non-acknowledging each transmission over each downlink CC scheduled in the downlink grant.

Figure 16:
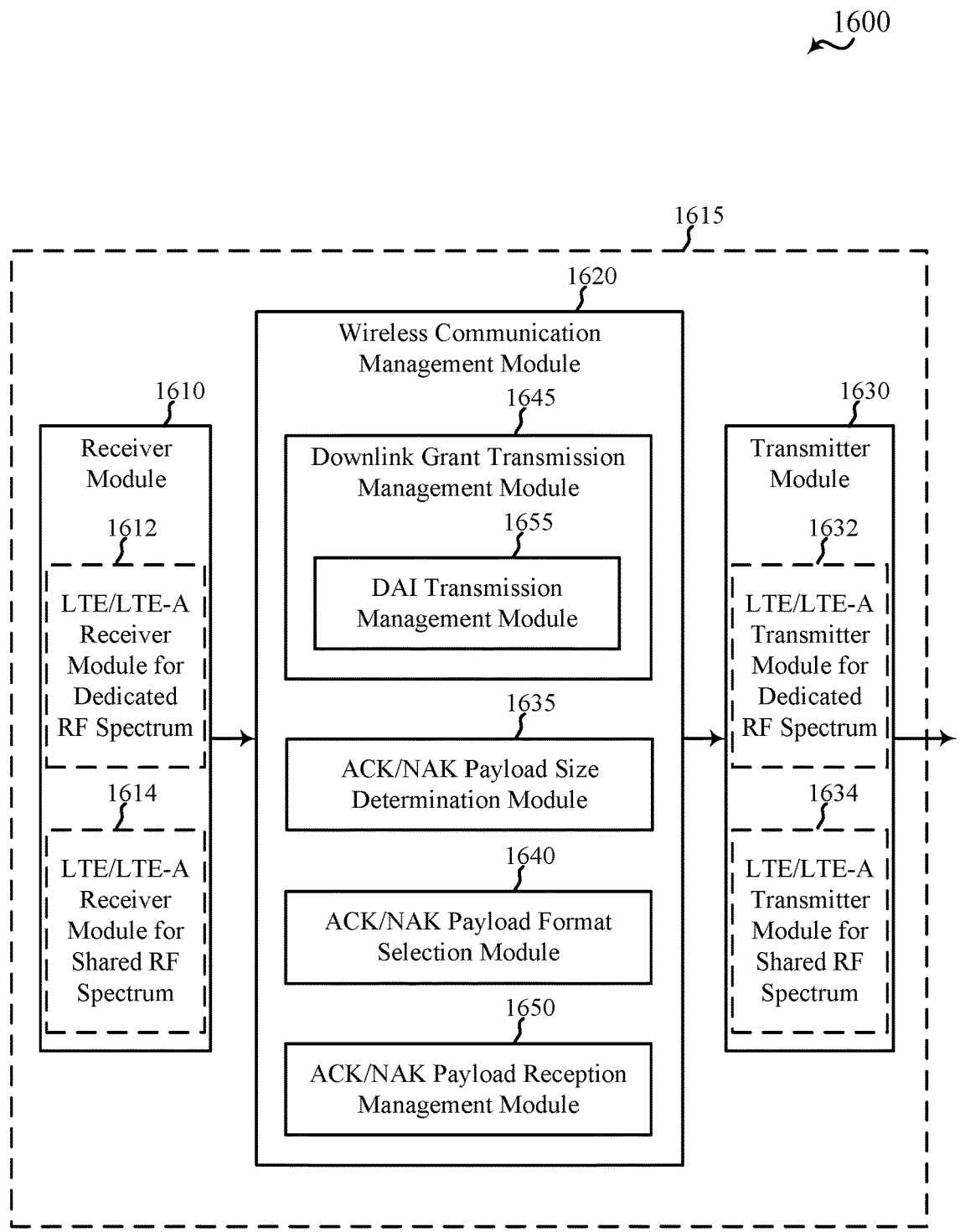
FIG. 16 shows a block diagram of an apparatus for use in wireless communication, in accordance with various aspects of the present disclosure.

FIG. 16 shows a block diagram 1600 of an apparatus 1615 for use in wireless communication, in accordance with various aspects of the present disclosure. The apparatus 1615 may be an example of aspects of one or more of the base stations 105, 205, 205-a, or 305 described with reference to FIG. 1, 2, or 3, or aspects of the apparatus 1115, 1215, or 1415 described with reference to FIG. 11, 12, or 14. The apparatus 1615 may also be or include a processor. The apparatus 1615 may include a receiver module 1610, a wireless communication management module 1620, or a transmitter module 1630. Each of these modules may be in communication with each other.

The modules of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1610 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, or 3. The receiver module 1610 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 1612), and an LTE/LTE-A receiver module for communicating over the shared radio frequency spectrum (e.g., LTE/LTE-A receiver module for shared RF spectrum 1614). The receiver module 1610, including the LTE/LTE-A receiver module for dedicated RF spectrum 1612 or the LTE/LTE-A receiver module for shared RF spectrum 1614, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum or the shared radio frequency spectrum.

In some examples, the transmitter module 1630 may include at least one RF transmitter, such as at least one RF transmitter operable to transmit over the dedicated radio frequency spectrum or the shared radio frequency spectrum. The transmitter module 1630 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 1632), and an LTE/LTE-A transmitter module for communicating over the shared radio frequency spectrum (e.g., LTE/LTE-A transmitter module for shared RF spectrum 1634). The transmitter module 1630, including the LTE/LTE-A transmitter module for dedicated RF spectrum 1632 or the LTE/LTE-A transmitter module for shared RF spectrum 1634, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum or the second radio frequency spectrum.

In some examples, the wireless communication management module 1620 may be used to manage one or more aspects of wireless communication for the apparatus 1615. In some examples, the wireless communication management module 1620 may include a downlink grant transmission management module 1645, an ACK/NAK payload size determination module 1635, an ACK/NAK payload format selection module 1640, or an ACK/NAK payload reception management module 1650.

In some examples, the downlink grant transmission management module 1645 may be used to transmit, to a UE, a plurality of downlink grants indicating the downlink CCs scheduled for the UE, and to transmit a plurality of DAIs, where each of the plurality of downlink grants includes a respective one of the DAIs in the plurality of DAIs. The downlink grant transmission management module 1645 may include a DAI transmission management module 1655 that may be used to transmit the plurality of DAIs.

In some examples, the ACK/NAK payload size determination module 1635 may be used to determine, based at least in part on a number of downlink CCs scheduled for the UE during a reporting interval, a number of bits to be included in a PUCCH ACK/NAK payload for the reporting interval.

In some examples, the ACK/NAK payload format selection module 1640 may be used to select, based at least in part on the determined number of bits, a format of the PUCCH ACK/NAK payload.

In some examples of the apparatus 1615, the respective DAI for a downlink grant may indicate a bit mapping and resource selection, in the PUCCH ACK/NAK payload, for acknowledging/non-acknowledging each transmission over each downlink CC scheduled in the downlink grant.

In some examples of the apparatus 1615, the plurality of DAIs may include a plurality of sequence numbers. In these examples, the DAI transmission management module 1655 may introduce sequence discontinuities in the plurality of sequence numbers, to increase the number of bits to be included in the PUCCH ACK/NAK payload.

In some examples, the ACK/NAK payload reception management module 1050 may be used to receive the PUCCH ACK/NAK payload and use a set of ACK/NAK bits in the PUCCH ACK/NAK payload, which set of ACK/NAK bits correspond to the sequence discontinuities introduced by the DAI transmission management module 1655, as a virtual CRC. In some examples, the DAI transmission management module 1655 may introduce sequence discontinuities in the plurality of sequence numbers to both increase the number of bits to be included in the PUCCH ACK/NAK payload and to increase the length of the virtual CRC.

In some examples, aspects of two or more of the apparatuses 1100, 1200, 1300, or 1500 described with reference to FIG. 11, 12, 13, or 15 may be combined, or aspects of two or more of the apparatuses 1100, 1200, 1400, or 1600 described with reference to FIG. 11, 12, 14, or 16 may be combined.

Figure 17:
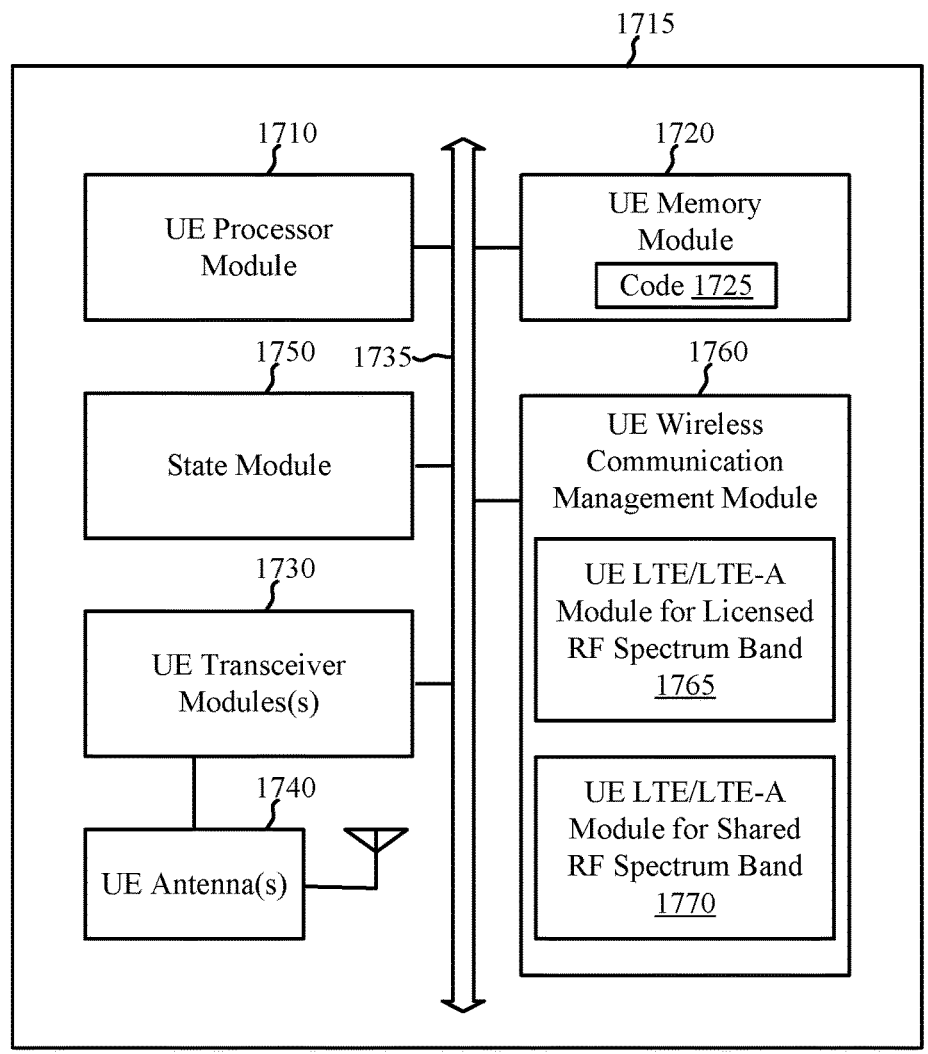
FIG. 17 shows a block diagram of a UE for use in wireless communication, in accordance with various aspects of the present disclosure.

FIG. 17 shows a block diagram 1700 of a UE 1715 for use in wireless communication, in accordance with various aspects of the present disclosure. The UE 1715 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1715 may, in some examples, have an internal power supply (not shown), such as a small battery, to facilitate mobile operation. In some examples, the UE 1715 may be an example of aspects of one or more of the UE 115, 215, 215-a, 215-b, 215-c, or 315 described with reference to FIG. 1, 2, or 3, or aspects of one or more of the apparatuses 1115, 1215, 1315, or 1515 described with reference to FIG. 11, 12, 13, or 15. The UE 1715 may be configured to implement at least some of the UE or apparatus features and functions described with reference to FIG. 1, 2, 3, 4, 5, 6, 7, 8, 9, 10, 11, 12, 13, or 15.

The UE 1715 may include a UE processor module 1710, a UE memory module 1720, at least one UE transceiver module (represented by UE transceiver module(s) 1730), at least one UE antenna (represented by UE antenna(s) 1740), or a UE wireless communication management module 1760. Each of these components may be in communication with each other, directly or indirectly, over one or more buses 1735.

The UE memory module 1720 may include random access memory (RAM) or read-only memory (ROM). The UE memory module 1720 may store computer-readable, computer-executable code 1725 containing instructions that are configured to, when executed, cause the UE processor module 1710 to perform various functions described herein related to wireless communication, including the selection of a format of a PUCCH ACK/NAK payload based at least in part on a number of bits to be included in the PUCCH ACK/NAK payload. Alternatively, the code 1725 may not be directly executable by the UE processor module 1710 but be configured to cause the UE 1715 (e.g., when compiled and executed) to perform various of the functions described herein.

The UE processor module 1710 may include an intelligent hardware device, e.g., a central processing unit (CPU), a microcontroller, an ASIC, etc. The UE processor module 1710 may process information received through the UE transceiver module(s) 1730 or information to be sent to the UE transceiver module(s) 1730 for transmission through the UE antenna(s) 1740. The UE processor module 1710 may handle, alone or in connection with the UE wireless communication management module 1760, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which apparatuses contend for access because the radio frequency spectrum band is available for unlicensed use, such as Wi-Fi use).

The UE transceiver module(s) 1730 may include a modem configured to modulate packets and provide the modulated packets to the UE antenna(s) 1740 for transmission, and to demodulate packets received from the UE antenna(s) 1740. The UE transceiver module(s) 1730 may, in some examples, be implemented as one or more UE transmitter modules and one or more separate UE receiver modules. The UE transceiver module(s) 1730 may support communications in the licensed radio frequency spectrum band or the shared radio frequency spectrum band. The UE transceiver module(s) 1730 may be configured to communicate bi-directionally, via the UE antenna(s) 1740, with one or more of the base stations 105, 205, 205-a, or 305 described with reference to FIG. 1, 2, or 3, or one or more of the apparatuses 1115, 1215, 1415, or 1615 described with reference to FIG. 11, 12, 14, or 16. While the UE 1715 may include a single UE antenna, there may be examples in which the UE 1715 may include multiple UE antennas 1740.

The UE state module 1750 may be used, for example, to manage transitions of the UE 1715 between an RRC idle state and an RRC connected state, and may be in communication with other components of the UE 1715, directly or indirectly, over the one or more buses 1735. The UE state module 1750, or portions of it, may include a processor, or some or all of the functions of the UE state module 1750 may be performed by the UE processor module 1710 or in connection with the UE processor module 1710.

The UE wireless communication management module 1760 may be configured to perform or control some or all of the UE or apparatus features or functions described with reference to FIG. 1, 2, 3, 4, 5, 6, 7, 8, 9, 10, 11, 12, 13, or 15 related to wireless communication over a licensed radio frequency spectrum band or a shared radio frequency spectrum band. For example, the UE wireless communication management module 1760 may be configured to support a supplemental downlink mode, a carrier aggregation mode, a standalone mode, or a dual-connectivity mode using the licensed radio frequency spectrum band or the shared radio frequency spectrum band. The UE wireless communication management module 1760 may include a UE LTE/LTE-A module for licensed RF spectrum band 1765 configured to handle LTE/LTE-A communications in the licensed radio frequency spectrum band, and a UE LTE/LTE-A module for shared RF spectrum band 1770 configured to handle LTE/LTE-A communications in the shared radio frequency spectrum band. The UE wireless communication management module 1760, or portions of it, may include a processor, or some or all of the functions of the UE wireless communication management module 1760 may be performed by the UE processor module 1710 or in connection with the UE processor module 1710. In some examples, the UE wireless communication management module 1760 may be an example of the wireless communication management module 1120, 1220, 1320, or 1520 described with reference to FIG. 11, 12, 13, or 15.

Figure 18:
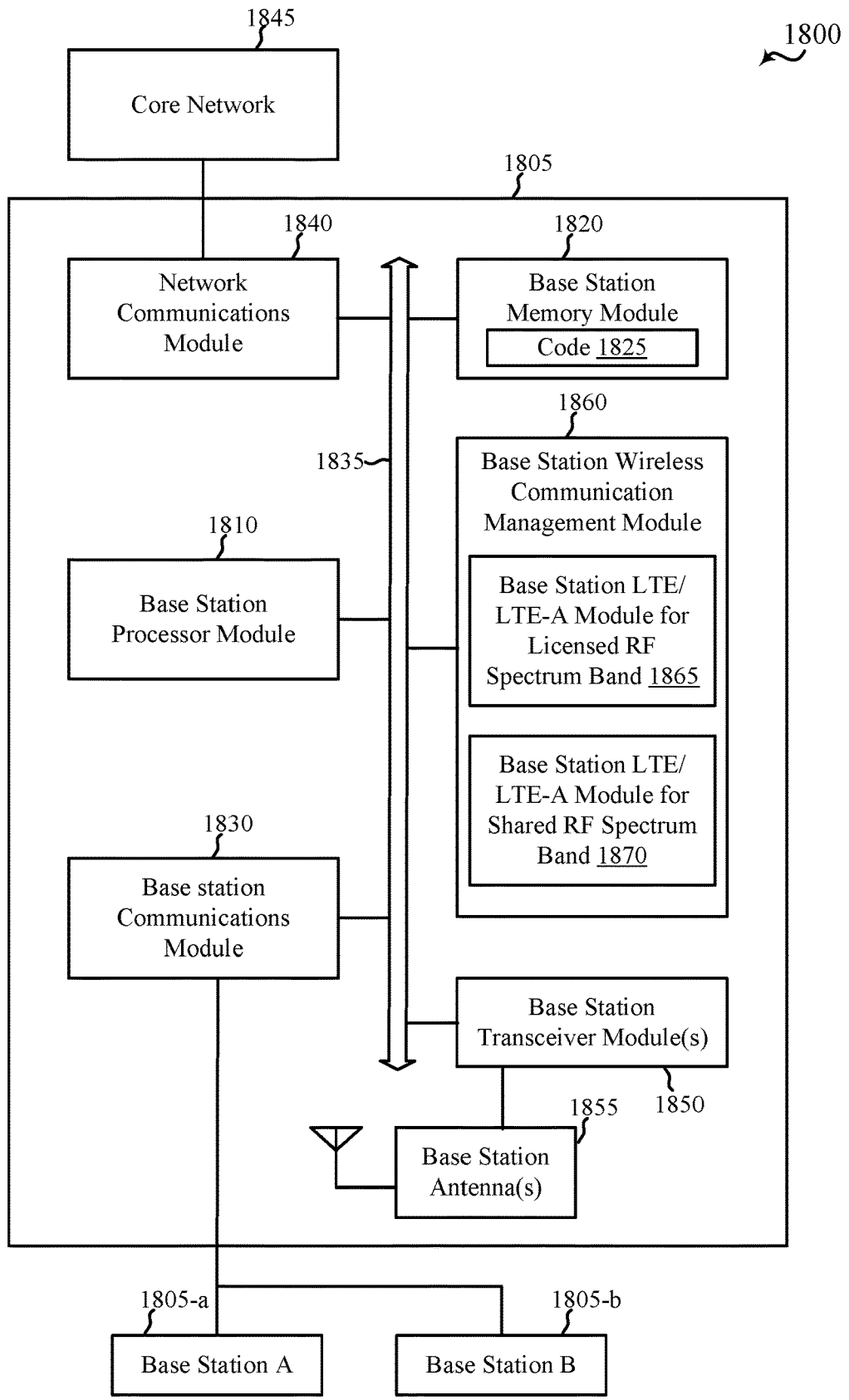
FIG. 18 shows a block diagram of a base station (e.g., a base station forming part or all of an eNB) for use in wireless communication, in accordance with various aspects of the present disclosure.

FIG. 18 shows a block diagram 1800 of a base station 1805 (e.g., a base station forming part or all of an eNB) for use in wireless communication, in accordance with various aspects of the present disclosure. In some examples, the base station 1805 may be an example of one or more aspects of the base station 105, 205, 205-a, or 305 described with reference to FIG. 1, 2, or 3. The base station 1805 may be configured to implement or facilitate at least some of the base station features and functions described with reference to FIG. 1, 2, 3, 4, 5, 6, 7, 8, 9, 10, 11, 12, 14, or 16.

The base station 1805 may include a base station processor module 1810, a base station memory module 1820, at least one base station transceiver module (represented by base station transceiver module(s) 1850), at least one base station antenna (represented by base station antenna(s) 1855), or a base station wireless communication management module 1860. The base station 1805 may also include one or more of a base station communications module 1830 or a network communications module 1840. Each of these components may be in communication with each other, directly or indirectly, over one or more buses 1835.

The base station memory module 1820 may include RAM or ROM. The base station memory module 1820 may store computer-readable, computer-executable code 1825 containing instructions that are configured to, when executed, cause the base station processor module 1810 to perform various functions described herein related to wireless communication, including the selection of a format of a PUCCH ACK/NAK payload based at least in part on a number of bits to be included in the PUCCH ACK/NAK payload. Alternatively, the code 1825 may not be directly executable by the base station processor module 1810 but be configured to cause the base station 1805 (e.g., when compiled and executed) to perform various of the functions described herein.

The base station processor module 1810 may include an intelligent hardware device, e.g., a CPU, a microcontroller, an ASIC, etc. The base station processor module 1810 may process information received through the base station transceiver module(s) 1850, the base station communications module 1830, or the network communications module 1840. The base station processor module 1810 may also process information to be sent to the transceiver module(s) 1850 for transmission through the antenna(s) 1855, to the base station communications module 1830, for transmission to one or more other base stations 1805-*a* and 1805-*b*, or to the network communications module 1840 for transmission to a core network 1845, which may be an example of one or more aspects of the core network 130 described with reference to FIG. 1. The base station processor module 1810 may handle, alone or in connection with the base station wireless communication management module 1860, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which apparatuses contend for access because the radio frequency spectrum band is available for unlicensed use, such as Wi-Fi use).

The base station transceiver module(s) 1850 may include a modem configured to modulate packets and provide the modulated packets to the base station antenna(s) 1855 for transmission, and to demodulate packets received from the base station antenna(s) 1855. The base station transceiver module(s) 1850 may, in some examples, be implemented as one or more base station transmitter modules and one or more separate base station receiver modules. The base station transceiver module(s) 1850 may support communications in the licensed radio frequency spectrum band or the shared radio frequency spectrum band. The base station transceiver module(s) 1850 may be configured to communicate bi-directionally, via the antenna(s) 1855, with one or more UEs or apparatuses, such as one or more of the UEs 115, 215, 215-*a*, 215-*b*, 215-*c*, or 1715 described with reference to FIG. 1, 2, or 17, or one or more of the apparatuses 1115, 1215, 1315, or 1515 described with reference to FIG. 11, 12, 13, or 15. The base station 1805 may, for example, include multiple base station antennas 1855 (e.g., an antenna array). The base station 1805 may communicate with the core network 1845 through the network communications module 1840. The base station 1805 may also communicate with other base stations, such as the base stations 1805-*a* and 1805-*b*, using the base station communications module 1830.

The base station wireless communication management module 1860 may be configured to perform or control some or all of the features or functions described with reference to FIG. 1, 2, 3, 4, 5, 6, 7, 8, 9, 10, 11, 12, 14, or 16 related to wireless communication over a licensed radio frequency spectrum band or a shared radio frequency spectrum band. For example, the base station wireless communication management module 1860 may be configured to support a supplemental downlink mode, a carrier aggregation mode, a standalone mode using, or a dual-connectivity mode using the licensed radio frequency spectrum band or the shared radio frequency spectrum band. The base station wireless communication management module 1860 may include a base station LTE/LTE-A module for licensed RF spectrum band 1865 configured to handle LTE/LTE-A communications in the licensed radio frequency spectrum band, and a base station LTE/LTE-A module for shared RF spectrum band 1870 configured to handle LTE/LTE-A communications in the shared radio frequency spectrum band. The base station wireless communication management module 1860, or portions of it, may include a processor, or some or all of the functions of the base station wireless communication management module 1860 may be performed by the base station processor module 1810 or in connection with the base station processor module 1810. In some examples, the base station wireless communication management module 1860 may be an example of the wireless communication management module 1120, 1220, 1420, or 1620 described with reference to FIG. 11, 12, 14, or 16.

Figure 19:
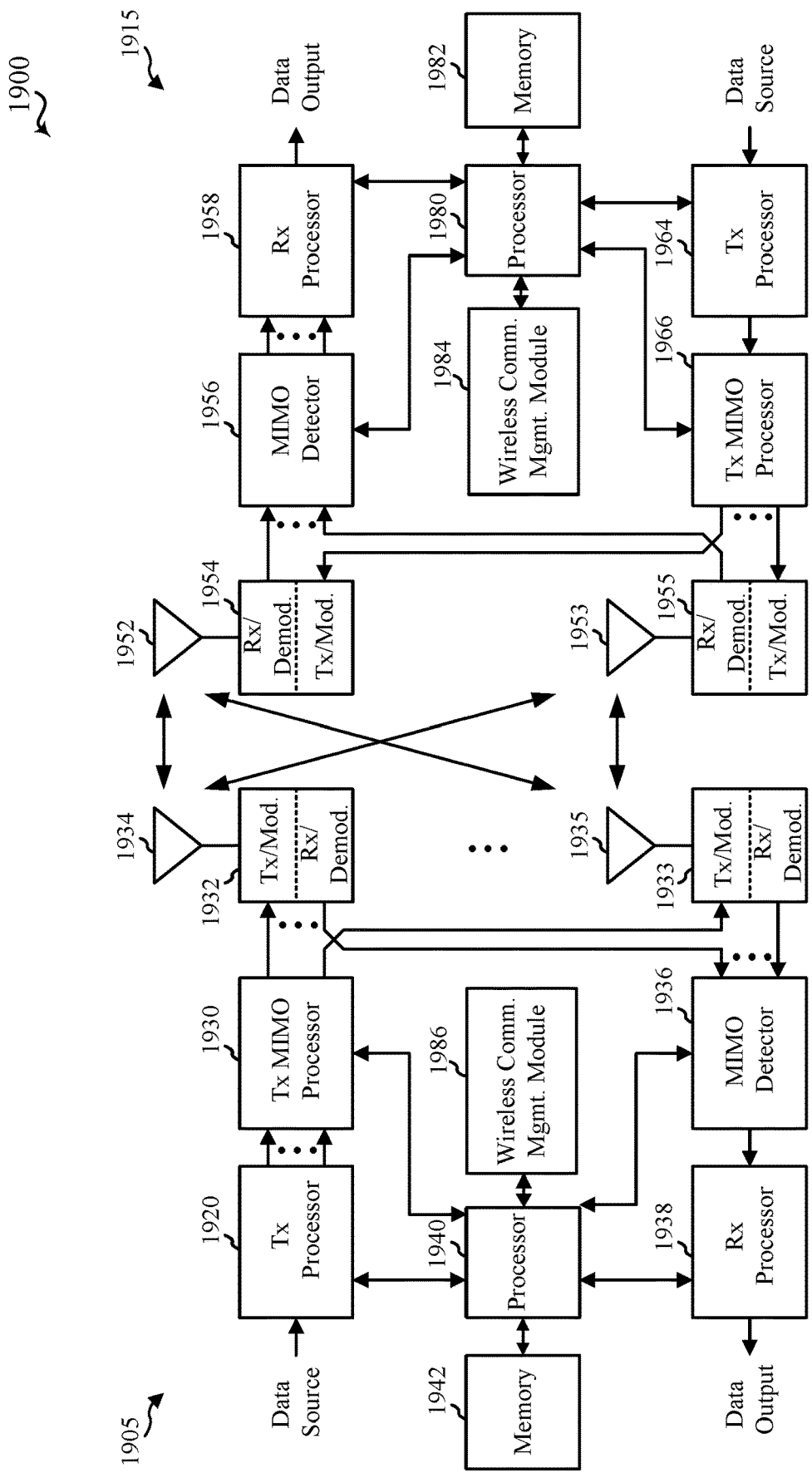
FIG. 19 is a block diagram of a multiple input/multiple output (MIMO) communication system including a base station and a UE, in accordance with various aspects of the present disclosure.

FIG. 19 is a block diagram of a multiple input/multiple output (MIMO) communication system 1900 including a base station 1905 and a UE 1915, in accordance with various aspects of the present disclosure. The MIMO communication system 1900 may illustrate aspects of the wireless communication system 100, 200, or 300 described with reference to FIG. 1, 2, or 3. The base station 1905 may be an example of aspects of the base station 105, 205, 205-*a*, or 1805 described with reference to FIG. 1, 2, or 18, or aspects of the apparatus 1115, 1215, 1415, or 1615 described with reference to 11, 12, 14, or 16. The base station 1905 may be equipped with antennas 1934 through 1935, and the UE 1915 may be equipped with antennas 1952 through 1953. In the MIMO communication system 1900, the base station 1905 may be able to send data over multiple communication links at the same time. Each communication link may be called a "layer" and the "rank" of the communication link may indicate the number of layers used for communication. For example, in a 2×2 MIMO communications system where base station 1905 transmits two "layers," the rank of the communication link between the base station 1905 and the UE 1915 is two.

At the base station 1905, a transmit processor 1920 may receive data from a data source. The transmit processor 1920 may process the data. The transmit processor 1920 may also generate control symbols or reference symbols. A transmit (Tx) MIMO processor 1930 may perform spatial processing (e.g., precoding) on data symbols, control symbols, or reference symbols, if applicable, and may provide output symbol streams to the transmit modulators 1932 through 1933. Each modulator 1932 through 1933 may process a respective output symbol stream (e.g., for OFDM, etc.) to obtain an output sample stream. Each modulator 1932 through 1933 may further process (e.g., convert to analog, amplify, filter, and upconvert) the output sample stream to obtain a DL signal. In one example, DL signals from modulators 1932 through 1933 may be transmitted via the antennas 1934 through 1935, respectively.

The UE 1915 may be an example of aspects of the UE 115, 215, 215-*a*, 215-*b*, 215-*c*, or 1715 described with reference to FIG. 1, 2, or 17, or aspects of the apparatus 1115, 1215, 1315, or 1515 described with reference to FIG. 11, 12, 13, or 15. At the UE 1915, the UE antennas 1952 through 1953 may receive the DL signals from the base station 1905 and may provide the received signals to the demodulators 1954 through 1955, respectively. Each demodulator 1954 through 1955 may condition (e.g., filter, amplify, downconvert, and digitize) a respective received signal to obtain input samples. Each demodulator 1954 through 1955 may further process the input samples (e.g., for OFDM, etc.) to obtain received symbols. A MIMO detector 1956 may obtain received symbols from all the demodulators 1954 through 1955, perform MIMO detection on the received symbols, if applicable, and provide detected symbols. A receive (Rx) processor 1958 may process (e.g., demodulate, deinterleave, and decode) the detected symbols, providing decoded data for the UE 1915 to a data output, and provide decoded control information to a processor 1980, or memory 1982.

The processor 1980 may in some cases execute stored instructions to instantiate a wireless communication management module 1984. The wireless communication management module 1984 may be an example of aspects of the wireless communication management module 1120, 1220, 1320, 1520, or 1760 described with reference to FIG. 11, 12, 13, 15, or 17.

On the uplink (UL), at the UE 1915, a transmit processor 1964 may receive and process data from a data source. The transmit processor 1964 may also generate reference symbols for a reference signal. The symbols from the transmit processor 1964 may be precoded by a transmit MIMO processor 1966 if applicable, further processed by the modulators 1954 through 1955 (e.g., for SC-FDMA, etc.), and be transmitted to the base station 1905 in accordance with the transmission parameters received from the base station 1905. At the base station 1905, the UL signals from the UE 1915 may be received by the antennas 1934 through 1935, processed by the demodulators 1932 through 1933, detected by a MIMO detector 1936 if applicable, and further processed by a receive processor 1938. The receive processor 1938 may provide decoded data to a data output and to the processor 1940 or memory 1942.

The processor 1940 may in some cases execute stored instructions to instantiate a wireless communication management module 1986. The wireless communication management module 1986 may be an example of aspects of the wireless communication management module 1120, 1220, 1420, 1620, or 1860 described with reference to FIG. 11, 12, 14, 16, or 18.

The components of the UE 1915 may, individually or collectively, be implemented with one or more ASICs adapted to perform some or all of the applicable functions in hardware. Each of the noted modules may be a means for performing one or more functions related to operation of the MIMO communication system 1900. Similarly, the components of the base station 1905 may, individually or collectively, be implemented with one or more ASICs adapted to perform some or all of the applicable functions in hardware. Each of the noted components may be a means for performing one or more functions related to operation of the MIMO communication system 1900.

Figure 20:
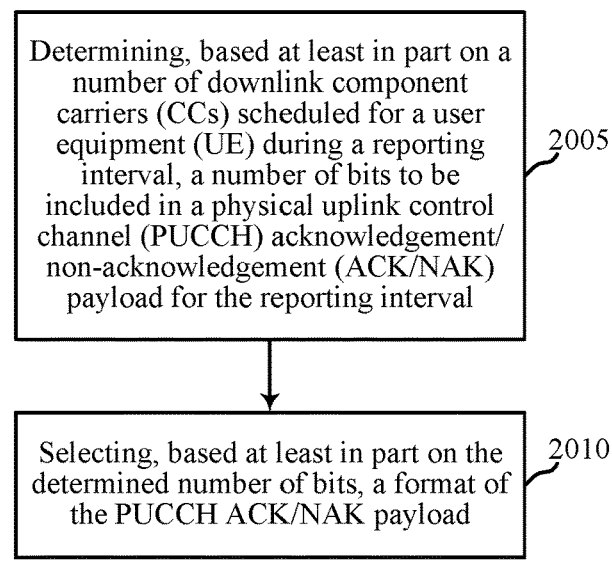
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the UEs 115, 215, 215-*a*, 215-*b*, 215-*c*, 1715, or 1815 described with reference to FIG. 1, 2, 17, or 18, aspects of one or more of the base stations 105, 205, 205-*a*, 1805, or 1905 described with reference to FIG. 1, 2, 18, or 19, or aspects of one or more of the apparatuses 1115, 1215, 1315, 1415, 1515, or 1615 described with reference to FIG. 11, 12, 13, 14, 15, or 16. In some examples, a UE, base station, or apparatus may execute one or more sets of codes to control the functional elements of the UE, base station, or apparatus to perform the functions described below. Additionally or alternatively, the UE, base station, or apparatus may perform one or more of the functions described below using special-purpose hardware.

At block 2005, the method 2000 may include determining, based at least in part on a number of downlink CCs scheduled for a UE during a reporting interval, a number of bits to be included in a PUCCH ACK/NAK payload for the reporting interval. The operation(s) at block 2005 may be performed using the wireless communication management module 1120, 1220, 1320, 1420, 1520, 1620, 1760, 1860, 1984, or 1986 described with reference to FIG. 11, 12, 13, 14, 15, 16, 17, 18, or 19, or the ACK/NAK payload size determination module 1135, 1235, 1335, 1435, 1535, or 1635 described with reference to FIG. 11, 12, 13, 14, 15, or 16.

At block 2010, the method 2000 may include selecting, based at least in part on the determined number of bits, a format of the PUCCH ACK/NAK payload. The operation(s) at block 2010 may be performed using the wireless communication management module 1120, 1220, 1320, 1420, 1520, 1620, 1760, 1860, 1984, or 1986 described with reference to FIG. 11, 12, 13, 14, 15, 16, 17, 18, or 19, or the ACK/NAK payload format selection module 1140, 1240, 1340, 1440, 1540, or 1640 described with reference to FIG. 11, 12, 13, 14, 15, or 16.

In some examples of the method 2000, selecting the format of the PUCCH ACK/NAK payload may include selecting one of a plurality of predefined formats for the PUCCH ACK/NAK payload. The predefined formats for the PUCCH ACK/NAK payload may include, for example, different combinations of: UE multiplexing densities within a RB, spreading factors, or numbers of RBs allocated per symbol period. In some examples, each of the predefined formats for the PUCCH ACK/NAK payload may be based at least in part on a format including two reference signal symbol periods per slot (e.g., when the predefined formats are configured for transmissions, in a slot of a subframe, with a normal CP). In some examples, each of the predefined formats for the PUCCH ACK/NAK payload may be based at least in part on a format including one reference signal symbol period per slot (e.g., when the predefined formats are configured for transmissions, in a slot of a subframe, with an extended CP).

In examples of the method 2000 performed by a UE, the method 2000 may include receiving, at the UE, a number of downlink grants indicating the downlink CCs scheduled for the UE. In these examples, selecting the format of the PUCCH ACK/NAK payload may include selecting a format used to transmit the PUCCH ACK/NAK payload.

In examples of the method 2000 performed by a base station, the method 2000 may include transmitting, from a base station to the UE, a plurality of downlink grants indicating the downlink CCs scheduled for the UE. In these examples of the method, selecting the format of the PUCCH ACK/NAK payload may include selecting a format used to decode the PUCCH ACK/NAK payload.

Thus, the method 2000 may provide for wireless communication. It should be noted that the method 2000 is just one implementation and that the operations of the method 2000 may be rearranged or otherwise modified such that other implementations are possible.

Figure 21:
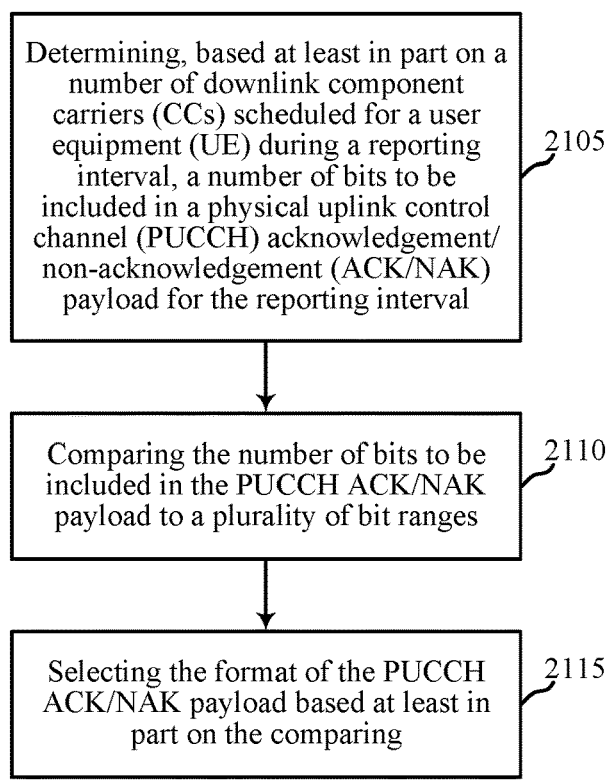
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the UEs 115, 215, 215-a, 215-b, 215-c, 1715, or 1815 described with reference to FIG. 1, 2, 17, or 18, aspects of one or more of the base stations 105, 205, 205-a, 1805, or 1905 described with reference to FIG. 1, 2, 18, or 19, or aspects of one or more of the apparatuses 1115, 1215, 1315, 1415, 1515, or 1615 described with reference to FIG. 11, 12, 13, 14, 15, or 16. In some examples, a UE, base station, or apparatus may execute one or more sets of codes to control the functional elements of the UE, base station, or apparatus to perform the functions described below. Additionally or alternatively, the UE, base station, or apparatus may perform one or more of the functions described below using special-purpose hardware.

At block 2105, the method 200 may include determining, based at least in part on a number of downlink CCs scheduled for a UE during a reporting interval, a number of bits to be included in a PUCCH ACK/NAK payload for the reporting interval. The operation(s) at block 2105 may be performed using the wireless communication management module 1120, 1220, 1320, 1420, 1520, 1620, 1760, 1860, 1984, or 1986 described with reference to FIG. 11, 12, 13, 14, 15, 16, 17, 18, or 19, or the ACK/NAK payload size determination module 1135, 1235, 1335, 1435, 1535, or 1635 described with reference to FIG. 11, 12, 13, 14, 15, or 16.

At blocks 2110 and 2115, a format of the PUCCH ACK/NAK may be selected based at least in part on the determined number of bits. More particularly, and at block 1610, the method 2100 may include comparing the number of bits to be included in the PUCCH ACK/NAK payload to a plurality of bit ranges. The operation(s) at block 2110 may be performed using the wireless communication management module 1120, 1220, 1320, 1420, 1520, 1620, 1760, 1860, 1984, or 1986 described with reference to FIG. 11, 12, 13, 14, 15, 16, 17, 18, or 19, or the ACK/NAK payload size comparison module 1245 described with reference to FIG. 12.

At block 2115, the method 2100 may include selecting the format of the PUCCH ACK/NAK payload based at least in part on the comparing performed at block 2110. In some examples, the selected format of the PUCCH ACK/NAK payload may be based at least in part on a format including two reference signal symbol periods per slot. The operation(s) at block 2115 may be performed using the wireless communication management module 1120, 1220, 1320, 1420, 1520, 1620, 1760, 1860, 1984, or 1986 described with reference to FIG. 11, 12, 13, 14, 15, 16, 17, 18, or 19, or the ACK/NAK payload format selection module 1140, 1240, 1340, 1440, 1540, or 1640 described with reference to FIG. 11, 12, 13, 14, 15, or 16.

In some examples of the method 2100, the selected format of the PUCCH ACK/NAK payload may be based at least in part on a format including two reference signal symbol periods per slot (e.g., when the selected format is for a transmission, in a slot of a subframe, with a normal CP). In some examples, the selected format of the PUCCH ACK/NAK payload may be based at least in part on a format including one reference signal symbol period per slot (e.g., when the selected format is for a transmission, in a slot of a subframe, with an extended CP).

In some examples of the method 2100, the selected format of the PUCCH ACK/NAK payload may include a UE multiplexing density, within a RB, of at least four UEs (e.g., four or five UEs). Such a format (i.e., a first format) may be selected, for example, when the number of bits to be included in the ACK/NAK payload is 21 or fewer bits (or from 1 to 21 bits) and a RB is configured as described with reference to FIG. 4 or 5.

In some examples of the method 2100, the selected format of the PUCCH ACK/NAK payload may include a UE multiplexing density, within a RB, of two UEs. The selected format may also include at least two groups of symbol periods, where each of the at least two groups of symbol periods includes at least one symbol, and where spreading is applied independently within each of the at least two groups of symbol periods. Such a format (i.e., a second format) may be selected, for example, when the number of bits to be included in the ACK/NAK payload is 60 or fewer bits (or from 22 to 60 bits) and a RB is configured as described with reference to FIG. 4 or 5.

In a first example of the second format, a spreading factor of three may be applied to a first group of three symbol periods and a spreading factor of two may be applied to a second group of two symbol periods, and two of three OCCs may be used when applying the spreading factor of three. In a second example of the second format, a first spreading factor of two may be applied to a first group of one symbol period, a second spreading factor of two may be applied to a second group of two symbol periods, and a third spreading factor of two may be applied within a third group of two symbol periods. In the second example of the second format, the first spreading factor may be applied using a Walsh code or using elements of an orthogonal FFT matrix. In a third example of the second format, each spreading factor of a plurality of spreading factors of two may be applied to a respective symbol period of a plurality of symbol periods. In the third example of the second format, each spreading factor of the plurality of spreading factors of two may be applied using a Walsh code or using elements of an orthogonal FFT matrix.

In some examples of the method 2100, the selected format of the PUCCH ACK/NAK payload may include no UE multiplexing within a RB, no spreading factor, and an RB allocation per symbol period of one. Such a format (i.e., a third format) may be selected, for example, when the number of bits to be included in the ACK/NAK payload is 120 or fewer bits (or from 61 to 120 bits) and a RB is configured as described with reference to FIG. 4 or 5.

In some examples of the method 2100, the selected format of the PUCCH ACK/NAK payload may include no UE multiplexing within a RB, no spreading factor, and an RB allocation per symbol period of two. Such a format (i.e., a fourth format) may be selected, for example, when the number of bits to be included in the ACK/NAK payload is 240 or fewer bits (or from 121 to 240 bits) and a RB is configured as described with reference to FIG. 4 or 5.

In some examples of the method 2100, the selected format of the PUCCH ACK/NAK payload may include no UE multiplexing within a RB, no spreading factor, and an RB allocation per symbol period of three. Such a format (i.e., a fifth format) may be selected, for example, when the number of bits to be included in the ACK/NAK payload is 360 or fewer bits (or from 241 to 360 bits) and a RB is configured as described with reference to FIG. 4 or 5.

Thus, the method 2100 may provide for wireless communication. It should be noted that the method 2100 is just one implementation and that the operations of the method 2100 may be rearranged or otherwise modified such that other implementations are possible.

Figure 22:
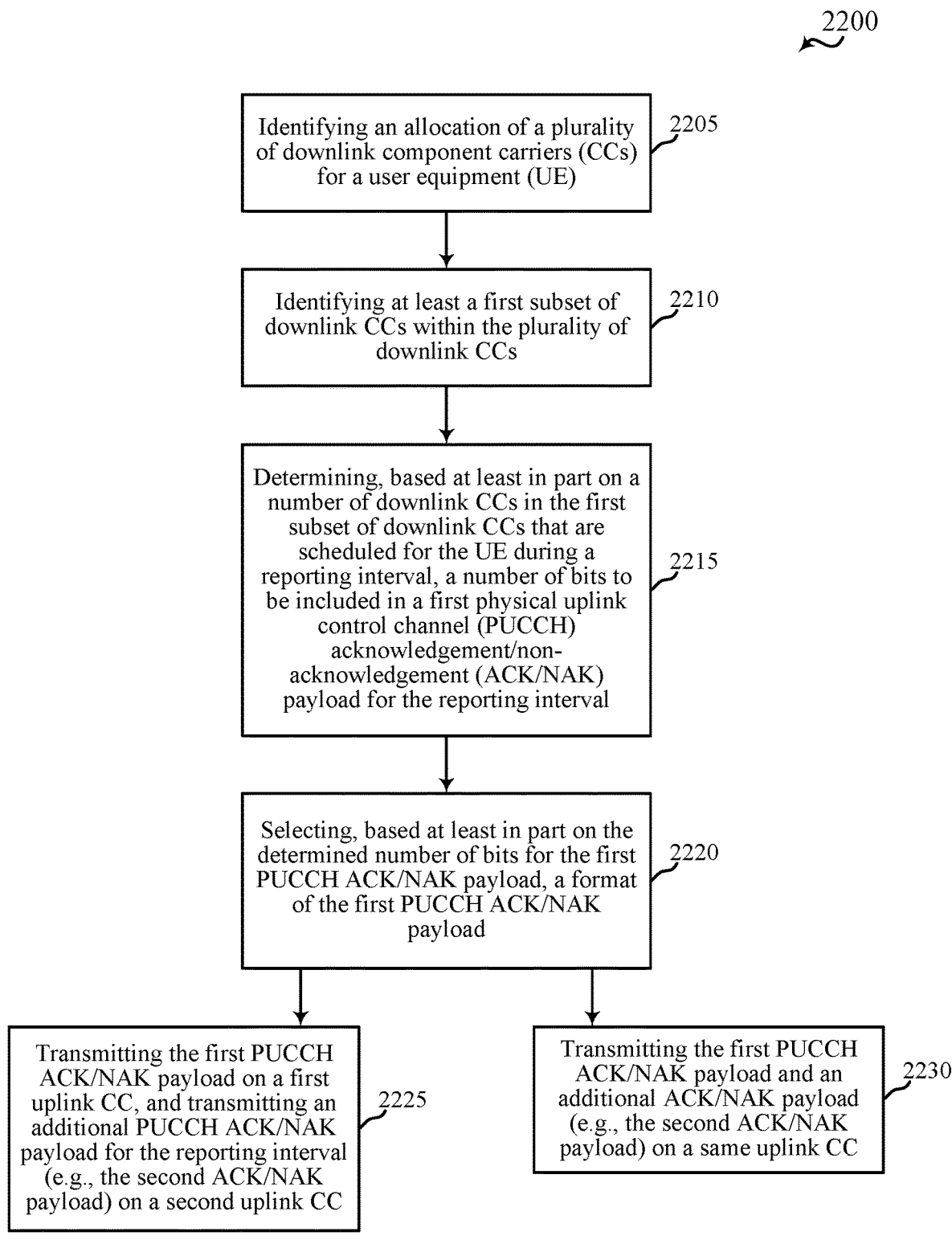
FIG. 22 is a flow chart illustrating an exemplary method for wireless communication, in accordance with various aspects of the present disclosure.

FIG. 22 is a flow chart illustrating an exemplary method 2200 for wireless communication, in accordance with various aspects of the present disclosure. For clarity, the method 2200 is described below with reference to aspects of one or more of the UEs 115, 215, 215-a, 215-b, 215-c, 1715, or 1815 described with reference to FIG. 1, 2, 17, or 18, or aspects of one or more of the apparatuses 1115, 1215, 1315, or 1515 described with reference to FIG. 11, 12, 13, or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2205, the method 2200 may include identifying an allocation of a plurality of downlink CCs for a UE. The operation(s) at block 2205 may be performed using the wireless communication management module 1120, 1220, 1320, 1520, 1760, or 1984 described with reference to FIG. 11, 12, 13, 15, 17, or 19, or the downlink CC identification module 1345 described with reference to FIG. 13.

At block 2210, the method 2200 may include identifying at least a first subset of downlink CCs within the plurality of downlink CCs. Additional subsets of downlink CCs may also be identified (e.g., a second subset of downlink CCs, etc.). The operation(s) at block 2210 may be performed using the wireless communication management module 1120, 1220, 1320, 1520, 1760, or 1984 described with reference to FIG. 11, 12, 13, 15, 17, or 19, or the downlink CC subset identification module 1350 described with reference to FIG. 13.

At block 2215, the method 2200 may include determining, based at least in part on a number of downlink CCs in the first subset of downlink CCs that are scheduled for the UE during a reporting interval, a number of bits to be included in a first PUCCH ACK/NAK payload for the reporting interval. The operation(s) performed at block 2215 may also include determining, based at least in part on a number of downlink CCs in each of one or more additional subsets of downlink CCs that are scheduled for the UE during a reporting interval (e.g., for the second subset of downlink CCs), a number of bits to be included in each of the one or more additional PUCCH ACK/NAK payloads (e.g., a second PUCCH ACK/NAK payload) for the reporting interval. The operation(s) at block 2215 may be performed using the wireless communication management module 1120, 1220, 1320, 1520, 1760, or 1984 described with reference to FIG. 11, 12, 13, 15, 17, or 19, or the ACK/NAK payload size determination module 1135, 1235, 1335, or 1535 described with reference to FIG. 11, 12, 13, or 15.

At block 2220, the method 2200 may include selecting, based at least in part on the determined number of bits for the first PUCCH ACK/NAK payload, a format of the first PUCCH ACK/NAK payload. The operation(s) at block 2220 may also include selecting, based at least in part on the determined number of bits for the PUCCH ACK/NAK payload(s) of each of the one or more additional subsets of downlink CCs (e.g., the second subset of downlink CCs), a format of each of the one or more additional PUCCH ACK/NAK payloads (e.g., the second PUCCH ACK/NAK payload). The operation(s) at block 2220 may be performed using the wireless communication management module 1120, 1220, 1320, 1520, 1760, or 1984 described with reference to FIG. 11, 12, 13, 15, 17, or 19, or the ACK/NAK payload format selection module 1140, 1240, 1340, or 1540 described with reference to FIG. 11, 12, 13, or 15.

At block 2225, the method 2200 may include transmitting the first PUCCH ACK/NAK payload on a first uplink CC, and transmitting an additional PUCCH ACK/NAK payload for the reporting interval (e.g., the second ACK/NAK payload) on a second uplink CC. Alternatively, and at block 1730, the method 1700 may include transmitting the first PUCCH ACK/NAK payload and an additional ACK/NAK payload (e.g., the second ACK/NAK payload) on a same uplink CC. The operation(s) at block 2225 or 2230 may be performed using the wireless communication management module 1120, 1220, 1320, 1520, 1760, or 1984 described with reference to FIG. 11, 12, 13, 15, 17, or 19, or the ACK/NAK payload transmission management module 1355 described with reference to FIG. 13.

Thus, the method 2200 may provide for wireless communication. It should be noted that the method 2200 is just one implementation and that the operations of the method 2200 may be rearranged or otherwise modified such that other implementations are possible.

Figure 23:
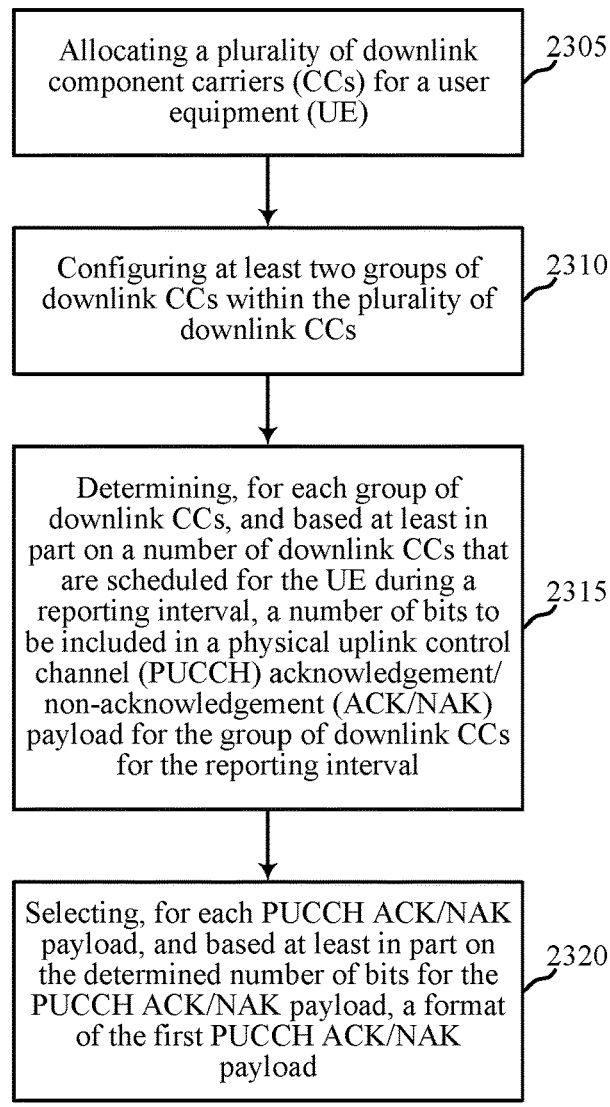
FIG. 23 is a flow chart illustrating an exemplary method for wireless communication, in accordance with various aspects of the present disclosure.

FIG. 23 is a flow chart illustrating an exemplary method 2300 for wireless communication, in accordance with various aspects of the present disclosure. For clarity, the method 2300 is described below with reference to aspects of one or more of the base stations 105, 205, 205-a, 1805, or 1905 described with reference to FIG. 1, 2, 18, or 19, or aspects of one or more of the apparatuses 1115, 1215, 1415, or 1615 described with reference to FIG. 11, 12, 14, or 16. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2305, the method 2300 may include allocating a plurality of downlink CCs for a UE. The operation(s) at block 2305 may be performed using the wireless communication management module 1120, 1220, 1420, 1620, 1860, or 1986 described with reference to FIG. 11, 12, 14, 16, 18, or 19, or the downlink CC allocation module 1445 described with reference to FIG. 14.

At block 2310, the method 2300 may include configuring at least two groups of downlink CCs (e.g., configuring at least a first subset of downlink CCs and a second subset of downlink CCs within the plurality of downlink CCs). The operation(s) at block 2310 may be performed using the wireless communication management module 1120, 1220, 1420, 1620, 1860, or 1986 described with reference to FIG. 11, 12, 14, 16, 18, or 19, or the downlink CC subset configuration module 1450 described with reference to FIG. 14.

At block 2315, the method 2300 may include determining, for each group of downlink CCs, and based at least in part on a number of downlink CCs that are scheduled for the UE during a reporting interval, a number of bits to be included in a PUCCH ACK/NAK payload for the group of downlink CCs for the reporting interval. Thus, for example, a first number of bits to be included in a first PUCCH ACK/NAK payload for a first group of downlink CCs may be determined, and a second number of bits to be included in a second PUCCH ACK/NAK payload for a second group of downlink CCs may be determined. The operation(s) at block 2315 may be performed using the wireless communication management module 1120, 1220, 1420, 1620, 1860, or 1986 described with reference to FIG. 11, 12, 14, 16, 18, or 19, or the ACK/NAK payload size determination module 1135, 1235, 1435, or 1635 described with reference to FIG. 11, 12, 14, or 16.

At block 2320, the method 2300 may include selecting, for each PUCCH ACK/NAK payload, and based at least in part on the determined number of bits for the PUCCH ACK/NAK payload, a format of the first PUCCH ACK/NAK payload. That is, a format of a PUCCH ACK/NAK payload may be selected for each of the at least two groups of downlink CCs. Also or alternatively, a format of a PUCCH ACK/NAK payload may be selected considering bundling of ACK/NAK bits for the downlink CCs within each of the at least two groups of downlink CCs. The operation(s) at block 2320 may be performed using the wireless communication management module 1120, 1220, 1420, 1620, 1860, or 1986 described with reference to FIG. 11, 12, 14, 16, 18, or 19, or the ACK/NAK payload format selection module 1140, 1240, 1440, or 1640 described with reference to FIG. 11, 12, 14, or 16.

Thus, the method 2300 may provide for wireless communication. It should be noted that the method 2300 is just one implementation and that the operations of the method 2300 may be rearranged or otherwise modified such that other implementations are possible.

Figure 24:
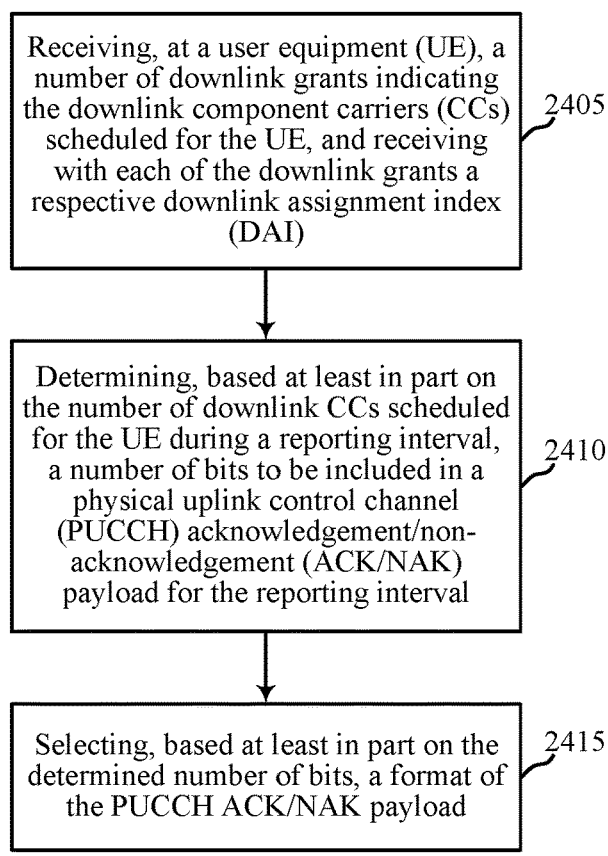
FIG. 24 is a flow chart illustrating an exemplary method for wireless communication, in accordance with various aspects of the present disclosure.

FIG. 24 is a flow chart illustrating an exemplary method 2400 for wireless communication, in accordance with various aspects of the present disclosure. For clarity, the method 2400 is described below with reference to aspects of one or more of the UEs 115, 215, 215-a, 215-b, 215-c, 1715, or 1815 described with reference to FIG. 1, 2, 17, or 18, or aspects of one or more of the apparatuses 1115, 1215, 1315, or 1515 described with reference to FIG. 11, 12, 13, or 15. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2405, the method 2400 may include receiving, at a UE, a number of downlink grants indicating the downlink CCs scheduled for the UE, and receiving with each of the downlink grants a respective DAI. The operation(s) at block 2405 may be performed using the wireless communication management module 1120, 1220, 1320, 1520, 1760, or 1984 described with reference to FIG. 11, 12, 13, 15, 17, or 19, or the downlink grant processing module 1545 or DAI processing module 1550 described with reference to FIG. 15.

At block 2410, the method 2400 may include determining, based at least in part on the number of downlink CCs scheduled for the UE during a reporting interval, a number of bits to be included in a PUCCH ACK/NAK payload for the reporting interval. The operation(s) at block 2410 may be performed using the wireless communication management module 1120, 1220, 1320, 1520, 1760, or 1984 described with reference to FIG. 11, 12, 13, 15, 17, or 19, or the ACK/NAK payload size determination module 1135, 1235, 1335, or 1535 described with reference to FIG. 11, 12, 13, or 15.

At block 2415, the method 2400 may include selecting, based at least in part on the determined number of bits, a format of the PUCCH ACK/NAK payload. The operation(s) at block 2415 may be performed using the wireless communication management module 1120, 1220, 1320, 1520, 1760, or 1984 described with reference to FIG. 11, 12, 13, 15, 17, or 19, or the ACK/NAK payload format selection module 1140, 1240, 1340, or 1540 described with reference to FIG. 11, 12, 13, or 15.

In some examples of the method 2400, the respective DAI for a downlink grant may indicate a bit mapping and resource selection, in the PUCCH ACK/NAK payload, for acknowledging/non-acknowledging each transmission over each downlink CC scheduled in the downlink grant.

In some examples of the method 2400, the respective DAI for a downlink grant may include a sequence number indicating a relationship between at least one downlink CC scheduled in the downlink grant and at least one downlink CC scheduled in another downlink grant. In these examples, the method 2400 may further include determining, based at least in part on the sequence number, a bit mapping and resource selection, in the PUCCH ACK/NAK payload, for acknowledging/non-acknowledging each transmission over each downlink CC scheduled in the downlink grant.

Thus, the method 2400 may provide for wireless communication. It should be noted that the method 2400 is just one implementation and that the operations of the method 2400 may be rearranged or otherwise modified such that other implementations are possible.

Figure 25:
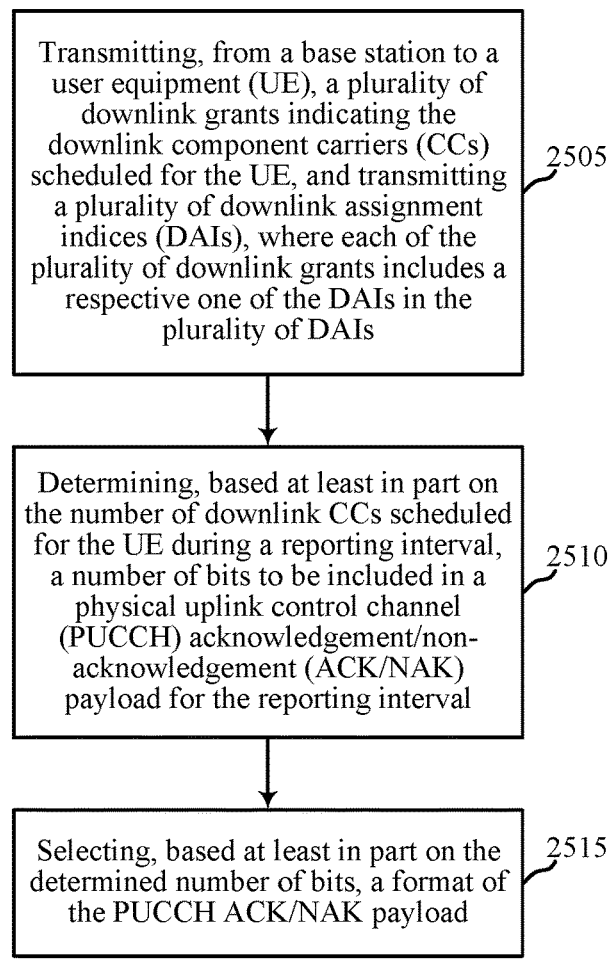
FIG. 25 is a flow chart illustrating an exemplary method for wireless communication, in accordance with various aspects of the present disclosure.

FIG. 25 is a flow chart illustrating an exemplary method 2500 for wireless communication, in accordance with various aspects of the present disclosure. For clarity, the method 2500 is described below with reference to aspects of one or more of the base stations 105, 205, 205-a, 1805, or 1905 described with reference to FIG. 1, 2, 18, or 19, or aspects of one or more of the apparatuses 1115, 1215, 1415, or 1615 described with reference to FIG. 11, 12, 14, or 16. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2505, the method 2500 may include transmitting, from a base station to a UE, a plurality of downlink grants indicating the downlink CCs scheduled for the UE, and transmitting a plurality of DAIs, where each of the plurality of downlink grants includes a respective one of the DAIs in the plurality of DAIs. The operation(s) at block 2505 may be performed using the wireless communication management module 1120, 1220, 1420, 1620, 1860, or 1986 described with reference to FIG. 11, 12, 14, 16, 18, or 19, or the downlink grant transmission management module 1645 or DAI transmission management module 1655 described with reference to FIG. 16.

At block 2510, the method 2500 may include determining, based at least in part on the number of downlink CCs scheduled for the UE during a reporting interval, a number of bits to be included in a PUCCH ACK/NAK payload for the reporting interval. The operation(s) at block 2510 may be performed using the wireless communication management module 1120, 1220, 1420, 1620, 1860, or 1986 described with reference to FIG. 11, 12, 14, 16, 18, or 19, or the ACK/NAK payload size determination module 1135, 1235, 1435, or 1635 described with reference to FIG. 11, 12, 14, or 16.

At block 2515, the method 2500 may include selecting, based at least in part on the determined number of bits, a format of the PUCCH ACK/NAK payload. The operation(s) at block 2515 may be performed using the wireless communication management module 1120, 1220, 1420, 1620, 1860, or 1986 described with reference to FIG. 11, 12, 14, 16, 18, or 19, or the ACK/NAK payload format selection module 1140, 1240, 1440, or 1640 described with reference to FIG. 11, 12, 14, or 16.

In some examples of the method 2500, the respective DAI for a downlink grant may indicate a bit mapping and resource selection, in the PUCCH ACK/NAK payload, for acknowledging/non-acknowledging each transmission over each downlink CC scheduled in the downlink grant.

In some examples of the method 2500, the plurality of DAIs may include a plurality of sequence numbers. In these examples, the method 2500 may further include introducing sequence discontinuities in the plurality of sequence numbers, to increase the number of bits to be included in the PUCCH ACK/NAK payload. The method 2500 may also include receiving the PUCCH ACK/NAK payload and using a set of ACK/NAK bits in the PUCCH ACK/NAK payload, which set of ACK/NAK bits correspond to the sequence discontinuities, as a virtual CRC. In some examples, sequence discontinuities may be introduced in the plurality of sequence numbers to both increase the number of bits to be included in the PUCCH ACK/NAK payload and to increase the length of the virtual CRC.

Thus, the method 2500 may provide for wireless communication. It should be noted that the method 2500 is just one implementation and that the operations of the method 2500 may be rearranged or otherwise modified such that other implementations are possible.

In some examples, aspects of two or more of the methods 2000, 2100, 2200, or 2400 described with reference to FIG. 20, 21, 22, or 24 may be combined, or aspects of two or more of the methods 2000, 2100, 2300, or 2500 described with reference to FIG. 20, 21, 23, or 25 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   selecting a format of a physical uplink control channel (PUCCH) based at least on a size of an acknowledgement/non-acknowledgement (ACK/NAK) payload, wherein the format comprises a number of symbol periods; spreading modulation symbols of the ACK/NAK payload by a spreading factor of two within a symbol period of the PUCCH of the selected format, wherein the PUCCH of the selected format occupies one resource block in frequency; applying Discrete Fourier Transform (DFT) to the spread modulation symbols; and transmitting the PUCCH to a base station based on the spread modulation symbols with the DFT applied.

2. The method of claim 1, wherein the PUCCH of the selected format supports a multiplexing density of two.

3. The method of claim 1, further comprising: determining the size of the ACK/NAK payload based on a number of scheduled downlink component carriers.

4. The method of claim 1, wherein said selecting the format of the PUCCH comprises: selecting the format if the size of the ACK/NAK payload exceeds a threshold.

5. The method of claim 1, wherein said spreading the modulation symbols comprises: repeating, for a number of times, a block of the modulation symbols; and applying a spreading code with length equal to the spreading factor to the repeated blocks of the modulation symbols.

6. The method of claim 1, further comprising: performing Inverse Fast Fourier Transform (IFFT) after the DFT.

7. A user equipment (UE), comprising:
   a processor configured to: select a format of a physical uplink control channel (PUCCH) based at least on a size of an acknowledgement/non-acknowledgement (ACK/NAK) payload, wherein the format comprises a number of symbol periods;
   spread modulation symbols of the ACK/NAK payload by a spreading factor of two within a symbol period of the PUCCH of the selected format, wherein the PUCCH of the selected format occupies one resource block in frequency; and
   apply Discrete Fourier Transform (DFT) to the spread modulation symbols; and
   a transmitter configured to transmit the PUCCH to a base station based on the spread modulation symbols with the DFT applied.

8. The UE of claim 7, wherein the PUCCH of the selected format supports a multiplexing density of two.

9. The UE of claim 7, wherein the processor is further configured to: determining the size of the ACK/NAK payload based on a number of scheduled downlink component carriers.

10. The UE of claim 7, wherein the processor configured to select the format of the PUCCH comprises the processor configured to:
    select the format if the size of the ACK/NAK payload exceeds a threshold.

11. The UE of claim 7, wherein the processor configured to spread the modulation symbols comprises the processor configured to:
    repeat, for a number of times, a block of the modulation symbols; and
    apply a spreading code with length equal to the spreading factor to the repeated blocks of the modulation symbols.

12. The UE of claim 7, wherein the processor is further configured to: perform Inverse Fast Fourier Transform (IFFT) after the DFT.

13. An apparatus of wireless communication, comprising:
    means for selecting a format of a physical uplink control channel (PUCCH) based at least on a size of an acknowledgement/non-acknowledgement (ACK/NAK) payload, wherein the format comprises a number of symbol periods;
    means for spreading modulation symbols of the ACK/NAK payload by a spreading factor of two within a symbol period of the PUCCH of the selected format, wherein the PUCCH of the selected format occupies one resource block in frequency;
    means for applying Discrete Fourier Transform (DFT) to the spread modulation symbols; and
    means for transmitting the PUCCH to a base station based on the spread modulation symbols with the DFT applied.

14. The apparatus of claim 13, wherein the PUCCH of the selected format supports a multiplexing density of two.

15. The apparatus of claim 13, further comprising: means for determining the size of the ACK/NAK payload based on a number of scheduled downlink component carriers.

16. The apparatus of claim 13, wherein the means for selecting the format of the PUCCH comprises: means for selecting the format if the size of the ACK/NAK payload exceeds a threshold.

17. The apparatus of claim 13, wherein the means for spreading the modulation symbols comprises: means for repeating, for a number of times, a block of the modulation symbols; and means for applying a spreading code with length equal to the spreading factor to the repeated blocks of the modulation symbols.

18. The apparatus of claim 13, further comprising:
means for performing Inverse Fast Fourier Transform (IFFT) after the DFT.

19. A non-transitory computer-readable medium having instructions stored thereon, the instructions comprising codes executable for an apparatus to perform: selecting a format of a physical uplink control channel (PUCCH) based at least on a size of an acknowledgement/non-acknowledgement (ACK/NAK) payload, wherein the format comprises a number of symbol periods;
spreading modulation symbols of the ACK/NAK payload by a spreading factor of two within a symbol period of the PUCCH of the selected format, wherein the PUCCH of the selected format occupies one resource block in frequency;
applying Discrete Fourier Transform (DFT) to the spread modulation symbols; and
transmitting the PUCCH to a base station based on the spread modulation symbols with the DFT applied.

20. The non-transitory computer-readable medium of claim 19, wherein the PUCCH of the selected format and supports a multiplexing density of two.

21. The non-transitory computer-readable medium of claim 19, further comprising: codes for determining the size of the ACK/NAK payload based on a number of scheduled downlink component carriers.

22. The non-transitory computer-readable medium of claim 19, wherein the codes for selecting the format of the PUCCH comprises: codes for selecting the format if the size of the ACK/NAK payload exceeds a threshold.

23. The non-transitory computer-readable medium of claim 19, wherein the codes for spreading the modulation symbols comprises: codes for repeating, for a number of times, a block of the modulation symbols; and codes for applying a spreading code with length equal to the spreading factor to the repeated blocks of the modulation symbols.

24. The non-transitory computer-readable medium of claim 19, further comprising: codes for performing Inverse Fast Fourier Transform (IFFT) after the DFT.

* * * * *